United States Patent
Sakai et al.

(10) Patent No.: US 9,641,775 B2
(45) Date of Patent: May 2, 2017

(54) IMAGING APPARATUS, IMAGING SYSTEM, AND DRIVING METHOD OF IMAGING APPARATUS

(71) Applicant: CANON KABUSHIKI KAISHA, Tokyo (JP)

(72) Inventors: Seiichirou Sakai, Yokohama (JP); Hiroki Hiyama, Sagamihara (JP); Kazuo Yamazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 127 days.

(21) Appl. No.: 14/788,423

(22) Filed: Jun. 30, 2015

(65) Prior Publication Data
US 2016/0006956 A1  Jan. 7, 2016

(30) Foreign Application Priority Data
Jul. 2, 2014  (JP) .................. 2014-137248

(51) Int. Cl.
*H04N 5/374*  (2011.01)
*H04N 5/357*  (2011.01)

(52) U.S. Cl.
CPC .................. *H04N 5/3575* (2013.01)

(58) Field of Classification Search
CPC ...... H04N 5/378; H04N 5/3575; H04N 5/374; H04N 5/357; H04N 27/14694
See application file for complete search history.

(56) References Cited

U.S. PATENT DOCUMENTS

| 2008/0036891 A1* | 2/2008 | Ono ........... | H04N 5/3598 348/308 |
| 2009/0015696 A1* | 1/2009 | Ishida ......... | H04N 5/3598 348/241 |
| 2010/0149366 A1* | 6/2010 | Noda .......... | H04N 5/3598 348/222.1 |

FOREIGN PATENT DOCUMENTS

JP  2009-194569 A  8/2009

* cited by examiner

*Primary Examiner* — Tony Ko
(74) *Attorney, Agent, or Firm* — Canon USA, Inc. IP Division

(57) ABSTRACT

During a period in which an electric potential of one node of a holding capacitance shifts from a first electric potential to a second electric potential, the other node of the holding capacitance is in an electrically-floating state.

13 Claims, 13 Drawing Sheets

IMAGING APPARATUS, IMAGING SYSTEM, AND DRIVING METHOD OF IMAGING APPARATUS

BACKGROUND OF THE INVENTION

Field of the Invention

The present invention relates to an imaging apparatus, an imaging system, and a driving method of an imaging apparatus.

Description of the Related Art

When an imaging apparatus is irradiated with very strong light such as solar light, if correlated double sampling (CDS) is performed on a pixel irradiated with the strong light, a signal level may decrease and an image darker than original brightness may be generated. This phenomenon will be called a high-brightness darkening phenomenon.

In an imaging apparatus of Japanese Patent Application Laid-Open No. 2009-194569, a clipping unit is electrically connected to a vertical signal line to which a pixel outputs a signal. When a noise-level signal is output to the vertical signal line, the clipping unit described in Japanese Patent Application Laid-Open No. 2009-194569 controls an electric potential of the vertical signal line so as not to come closer to an optical signal-level electric potential than a predetermined electric potential. The imaging apparatus of Japanese Patent Application Laid-Open No. 2009-194569 thereby suppresses generation of the high-brightness darkening phenomenon. The clipping unit includes a transistor having a source and a drain, one of which is electrically connected to a power supply line. The other one of the source and the drain is electrically connected to the vertical signal line. A first node of a holding capacitance is electrically connected to the gate of this transistor. In addition, a second node of the holding capacitance is electrically connected to a shift unit serving as an electric potential supply unit. Japanese Patent Application Laid-Open No. 2009-194569 further describes a configuration in which an electric potential of the first node of the holding capacitance is shifted by the shift unit shifting an electric potential of the second node of the holding capacitance.

In the imaging apparatus of Japanese Patent Application Laid-Open No. 2009-194569, a signal holding unit connected to the vertical signal line resets the electric potential of the second node of the holding capacitance during a period from the end of sampling of a noise-level signal output to the vertical signal line to the end of sampling of an optical signal output to the vertical signal line. Through this reset operation, a charge/discharge current flows between the power supply line electrically connected to the holding capacitance and the holding capacitance. This charge/discharge current generates electric potential fluctuations in a power supply line of the electric potential supply unit. Such electric potential fluctuations in the power supply line generate, when the power supply line of the electric potential supply unit is electrically connected to a power supply line of a pixel, noise in a signal output from the pixel. The noise decreases the quality of an image generated according to a signal output from the imaging apparatus. Thus, in some cases, the charge/discharge current that flows from the holding capacitance to the power supply line electrically connected to the holding capacitance may generate noise in an optical signal output from a pixel.

SUMMARY OF THE INVENTION

According to an aspect of the present invention, an imaging apparatus includes: a plurality of pixels arrayed in a matrix, the plurality of pixels each including a photoelectric conversion unit, a charge-voltage converter configured to convert charges into a voltage, a transfer unit configured to transfer the charges from the photoelectric conversion unit to the charge-voltage converter, and an output unit configured to output a signal that is based on an electric potential of the charge-voltage converter; a signal line; a holding unit; a clipping unit; a holding capacitance; and a supply unit connected to a power supply line, wherein the clipping unit includes a clipping transistor for clipping an electric potential of the signal line, one of a source and a drain of the clipping transistor is connected to the signal line, and a reference electric potential is supplied to the other one of the source and the drain of the clipping transistor, the holding capacitance includes a first node connected to a control node of the clipping transistor, and a second node to which a plurality of electric potentials being different in electric potential from one another is supplied from the supply unit, the output unit outputs, to the signal line, a first signal that is based on a reset electric potential of the charge-voltage converter, the holding unit holds the first signal that is output to the signal line, the output unit subsequently outputs, to the signal line, a second signal that is based on the electric potential of the charge-voltage converter to which the charges are transferred from the photoelectric conversion unit, the holding unit holds the second signal that is output to the signal line, an electric potential of the first node is a first electric potential during a period in which the charge-voltage converter is reset, the electric potential of the first node shifts from the first electric potential to a second electric potential during a period from when the holding unit holds the first signal to when the holding unit holds the second signal, and by maintaining causing a path between the second node and the supply unit to be in a non-conductive state during a period from when the electric potential of the first node starts to shift from the first electric potential to the second electric potential to when the holding unit holds the second signal, the second node is maintained being in an electrically-floating state during a period from when the electric potential of the first node starts to shift from the first electric potential to the second electric potential to when the holding unit holds the second signal.

According to another aspect of the present invention, a driving method of an imaging apparatus including: a plurality of pixels arrayed in a matrix, the plurality of pixels each including a photoelectric conversion unit, a charge-voltage converter for converting charges into a voltage, and an output unit for outputting a signal that is based on an electric potential of the charge-voltage converter; a signal line; a holding unit; a clipping unit; a holding capacitance; and a supply unit connected to a power supply line, the clipping unit including a clipping transistor for clipping an electric potential of the signal line, one of a source and a drain of the clipping transistor being connected to the signal line, and a reference electric potential being supplied to the other one of the source and the drain of the clipping transistor, the holding capacitance including a first node connected to a control node of the clipping transistor, and a second node to which a plurality of electric potentials being different in electric potential from one another is supplied from the supply unit. The driving method includes: outputting to the signal line a first signal that is based on a reset electric potential of the charge-voltage converter; holding the first signal output to the vertical signal line; subsequently outputting to the signal line a second signal that is based on an electric potential of the charge-voltage converter to which the charges are transferred from the photoelectric conversion unit; holding the second signal output to the signal line; setting an electric potential of the first node to a first electric potential during a period in which the charge-voltage converter is reset; shifting the electric potential of the first node from the first electric potential to a second electric potential during a period from when the holding unit holds the first signal to when the holding unit holds the second signal; and by maintaining causing a path between the second node and the supply unit to be in a non-conductive state during a period from when the electric potential of the first node starts to shift from the first electric potential to the second electric potential to when the holding unit holds the second signal, maintaining causing the second node to be in an electrically-floating state during a period from when the electric potential of the first node starts to shift from the first electric potential to the second electric potential to when the holding unit holds the second signal.

Further features of the present invention will become apparent from the following description of exemplary embodiments (with reference to the attached drawings).

DESCRIPTION OF THE EMBODIMENTS

Various exemplary embodiments will be described below with reference to the drawings.

First Exemplary Embodiment

Figure 1A:
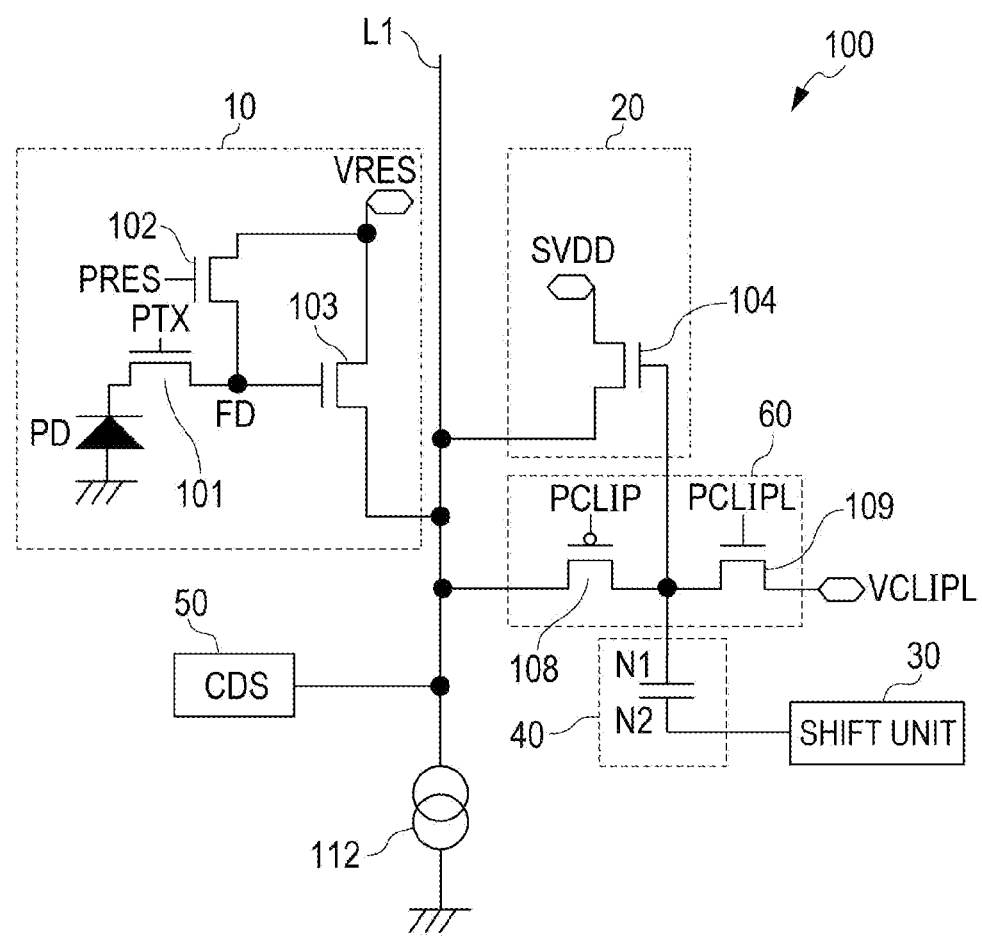
FIG. 1A is a diagram illustrating an example of a configuration of an imaging apparatus.

An imaging apparatus 100 according to a first exemplary embodiment will be described with reference to FIG. 1A. FIG. 1A is a circuit diagram of the imaging apparatus 100 according to the present exemplary embodiment.

The imaging apparatus 100 includes a pixel 10, a clipping unit 20, a shift unit 30, a holding capacitance 40, a correlated double sampling (CDS) circuit (difference circuit) 50, and a switch unit 60.

While one pixel 10 is illustrated in FIG. 1A, in the imaging apparatus 100 of the present exemplary embodiment, a plurality of pixels 10 is arrayed in a matrix in a pixel region of the imaging apparatus 100. Pixels 10 on the same column are electrically connected to a vertical signal line L1. FIG. 1A illustrates the clipping unit 20, the shift unit 30, the holding capacitance 40, the CDS circuit 50, and the switch unit 60 that correspond to one column of the pixel region.

Each pixel 10 includes a photoelectric conversion unit PD, a transfer unit 101, a charge-voltage converter FD, an amplification transistor (output unit) 103, and a reset transistor 102.

The photoelectric conversion unit PD generates charges corresponding to received light. The photoelectric conversion unit PD is, for example, a photodiode. An anode of the photoelectric conversion unit PD is grounded, and a cathode of the photoelectric conversion unit PD is electrically connected to the transfer unit 101.

The transfer unit 101 transfers charges generated in the photoelectric conversion unit PD to the charge-voltage converter FD. The transfer unit 101 is, for example, a transfer transistor.

The charge-voltage converter FD converts charges transferred from the transfer unit 101 into a voltage. The charge-voltage converter FD is, for example, an electrically-floating diffusion in a semiconductor substrate.

The amplification transistor 103 amplifies a signal that is based on charges transferred to the charge-voltage converter FD, and outputs the amplified signal. The gate of the amplification transistor 103 is an input node of the amplification transistor 103. The gate of the amplification transistor 103 is electrically connected to the charge-voltage converter FD. The amplification transistor 103 performs a source follower operation in conjunction with a current source 112 electrically connected via the vertical signal line L1. The amplification transistor 103 amplifies a signal that is based on an electric potential of the charge-voltage converter FD, and outputs the amplified signal to the vertical signal line L1.

The reset transistor 102 has a source and a drain, one of which is electrically connected to a power supply VRES. The other one of them is electrically connected to the charge-voltage converter FD. When an active signal PRES is supplied to the gate of the reset transistor 102, the reset transistor 102 is turned on to reset the charge-voltage converter FD to an electric potential corresponding to the power supply VRES.

Hereinafter, a readout pixel refers to the pixel 10 that is in a state of being selected by a vertical scan circuit (not illustrated) as a pixel outputting a signal to the vertical signal line L1. In addition, a non-readout pixel refers to the pixel 10 that is in a state of not outputting a signal to the vertical signal line L1. The power supply VRES is either one of two electric potentials: an electric potential VRESH to which the charge-voltage converter FD of a readout pixel is reset, and an electric potential VRESL to which the charge-voltage converter FD of a non-readout pixel is reset. By setting the electric potentials VRESH and VRESL so as to satisfy a relation VRESH>VRESL, the amplification transistor 103 of the pixel 10 operated as a readout pixel is turned on to supply a current defined by the current source 112.

In the following description, a "reset level" means an electric potential to be output to the vertical signal line L1 in a state in which the charge-voltage converter FD is reset by the reset transistor 102. To the contrary, a "noise level" means an electric potential actually output to the vertical signal line L1 in a state in which the charge-voltage converter FD is released from the reset by the reset transistor 102. When strong light enters the photoelectric conversion unit PD, charges generated in the photoelectric conversion unit PD leak into the charge-voltage converter FD, whereby a noise-level signal may become different from a signal to be originally output.

The switch unit 60 includes switching transistors 108 and 109. In this case, the switching transistor 108 is formed from a PMOS transistor, and the switching transistor 109 is formed from an NMOS transistor.

When an active signal PCLIP is supplied to the gate of the switching transistor 108 from a timing generator (not illustrated), the switching transistor 108 is turned on. When an inactive signal PCLIP is supplied to the gate of the switching transistor 108 from a timing generator (not illustrated), the switching transistor 108 is turned off.

When an inactive signal PCLIPL is supplied to the gate of the switching transistor 109 from a timing generator (not illustrated), the switching transistor 109 is turned off. When an active signal PCLIPL is supplied to the gate of the switching transistor 109 from a timing generator (not illustrated), the switching transistor 109 is turned on.

The holding capacitance 40 includes a first node N1 and a second node N2. The first node N1 is electrically connected to the switch unit 60. The second node N2 is a node facing the first node N1. The second node N2 is electrically connected to the shift unit 30. The shift unit 30 is an electric potential supply unit.

Figure 3:
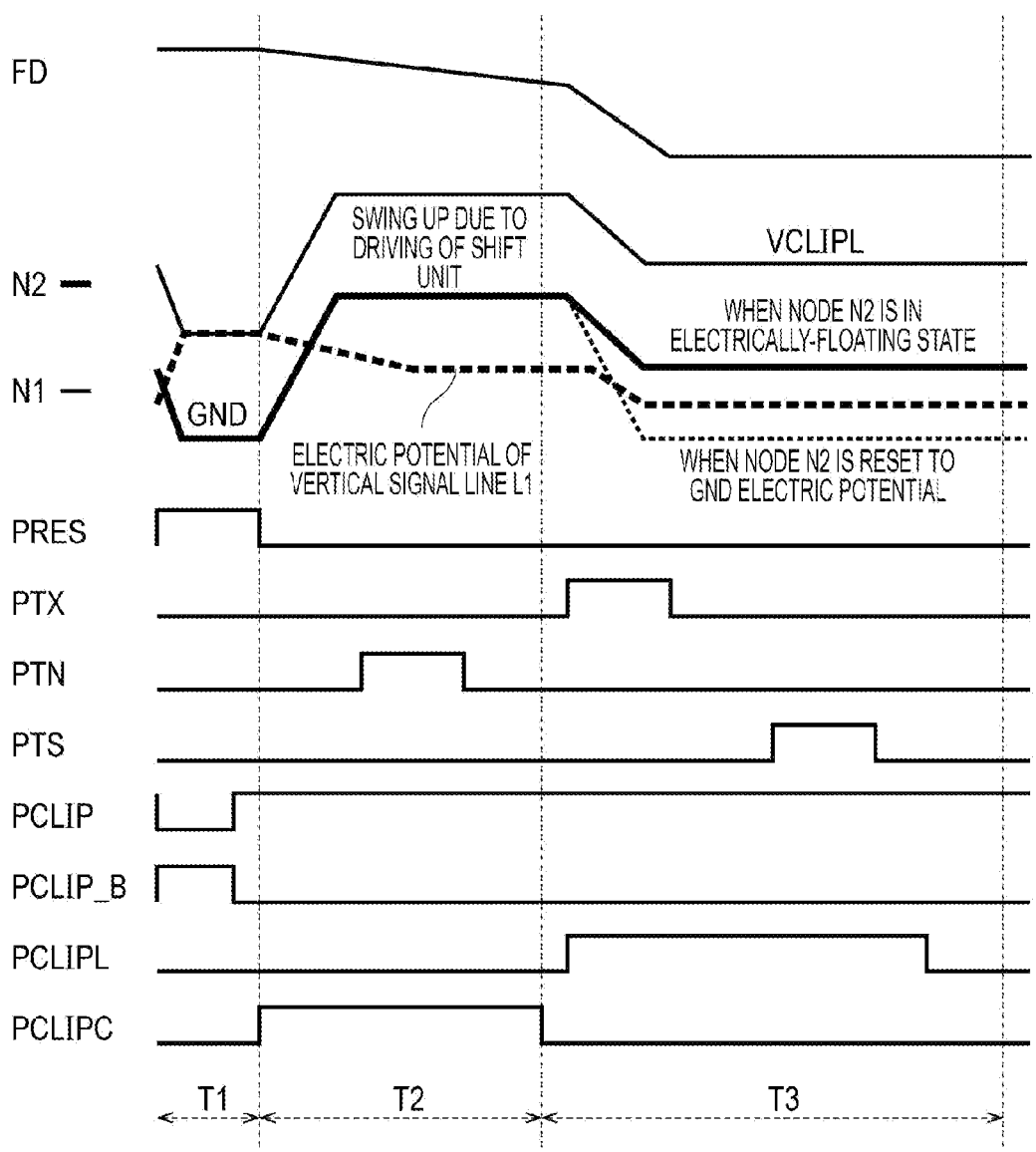
FIG. 3 is a diagram illustrating an example of an operation of an imaging apparatus.

The shift unit 30 shifts the electric potential of the second node N2 of the holding capacitance 40 in a direction in which the electric potential of the second node N2 comes close to the reset level, after the electric potential of the vertical signal line L1 is applied to the first node N1 via the switching transistor 108. Referring to FIG. 3, this direction is a direction opposite to a direction in which the electric potential of the charge-voltage converter FD changes owing to charges transferred from the photoelectric conversion unit PD to the charge-voltage converter FD. For example, if the electric potential of the charge-voltage converter FD decreases owing to charges transferred from the photoelectric conversion unit PD to the charge-voltage converter FD, the shift unit 30 increases the electric potential of the second node N2. As a result, the shift unit 30 can shift the electric potential of the first node N1 of the holding capacitance 40 so that the electric potential of the first node N1 comes close to the reset level. The amount of shift by the shift unit 30 is equal to or larger than the amount of voltage drop in the clipping unit 20, and equal to or smaller than the difference between the noise level and the reset level. More specifically, if a first signal is assumed to be a signal output to the vertical signal line L1 in a state in which the charge-voltage converter FD is reset, the upper limit of the shift amount can be equal to or smaller than the difference between the changed first signal after the change of the electric potential of the charge-voltage converter FD, and the unchanged first signal before the change of the electric potential of the charge-voltage converter FD.

The clipping unit 20 clips the electric potential of the vertical signal line L1 to a clipping electric potential obtained by subtracting the amount of voltage drop in the clipping unit 20 from the electric potential of the first node N1. The clipping unit 20 includes an NMOS transistor 104. The NMOS transistor 104 has a gate electrically connected to the first node N1 of the holding capacitance 40. The gate of the NMOS transistor 104 is a control node of the NMOS transistor 104. In addition, a first main node, which is one of a source and a drain of the NMOS transistor 104, is electrically connected to the vertical signal line L1. In addition, a second main node, which is the other one of the source and the drain of the NMOS transistor 104, is electrically connected to a power supply SVDD for supplying a reference electric potential. This power supply SVDD is also connected to a line for applying the electric potential VRESH to the power supply VRES of the pixel 10. The NMOS transistor 104 receives at the gate the input electric potential of the first node N1, and clips the electric potential of the vertical signal line L1 to a clipping electric potential obtained by subtracting the amount of voltage drop including at least a threshold voltage from the electric potential of the first node N1. In other words, the NMOS transistor 104 clips the electric potential of the vertical signal line L1 to an electric potential that is based on the electric potential of the first node N1. In the present exemplary embodiment, the amplification transistor 103 is an NMOS transistor of the same conductivity type as that of the NMOS transistor 104. The NMOS transistor 104 is a clipping transistor.

The clipping unit 20 clips the electric potential of the vertical signal line L1 to an electric potential lower than an electric potential supplied to the gate of the NMOS transistor 104. Thus, the shift amount of the electric potential of the first node N1 of the holding capacitance 40 can also be set so as to reduce the amount of voltage drop. The shift amount may be set equal to the amount of voltage drop in the clipping unit 20.

The CDS circuit 50 performs correlated double sampling (CDS) processing to calculate the difference between a noise-level signal and an optical signal that are output from the pixel 10 to the vertical signal line L1. Through the CDS processing, the CDS circuit 50 outputs an image signal obtained by reducing noise components of the optical signal.

Figure 1B:
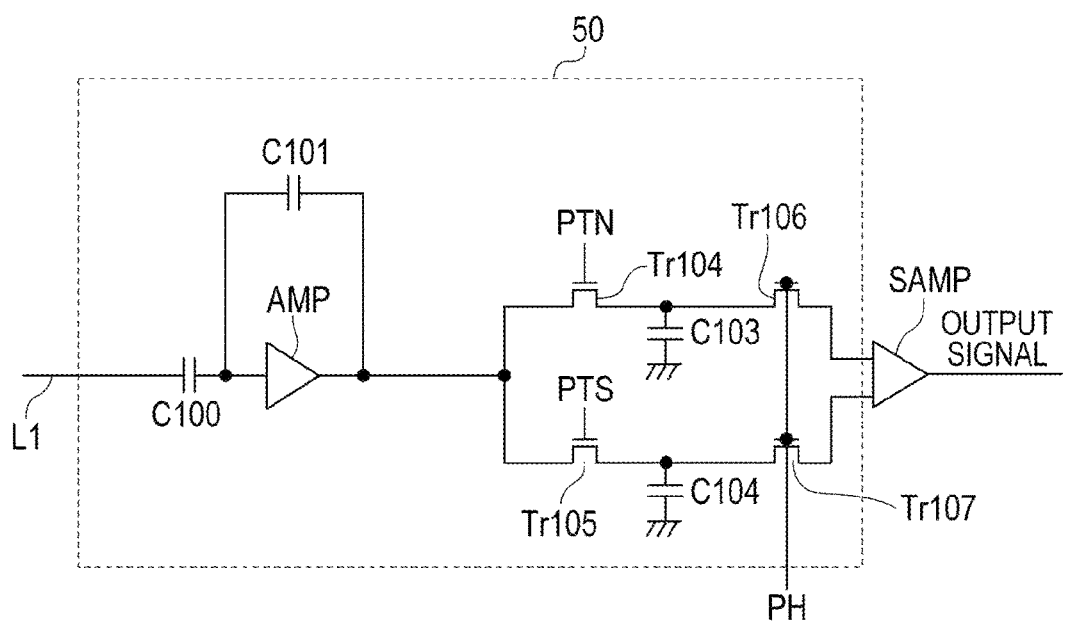
FIG. 1B is a diagram illustrating an example of a configuration of a correlated double sampling (CDS) circuit.

FIG. 1B is a diagram illustrating the CDS circuit 50 according to the present exemplary embodiment together with an amplifier SAMP for amplifying a signal output from the CDS circuit 50. The amplifier SAMP is connected in common to CDS circuits 50 in a plurality of columns.

One node of a capacitive element C100 is electrically connected to the vertical signal line L1 and the other node thereof is electrically connected to a differential amplifier AMP. The capacitive element C100 clamps a noise-level signal. The capacitive element C100 outputs, to the differential amplifier AMP, a signal obtained by subtracting a noise-level signal from an optical signal output to the vertical signal line L1. The differential amplifier AMP amplifies the signal obtained by subtracting the noise-level signal from the optical signal, based on the capacitance ratio of the capacitive element C100 to a feedback capacitive element C101.

Signals PTN and PTS are signals output from a timing generator (not illustrated). When the timing generator sets the signal PTN to active, a switching transistor Tr104 is turned on. In contrast, when the timing generator sets the signal PTN to inactive, a capacitive element C103 holds a signal output from the differential amplifier AMP. When the timing generator sets the signal PTS to active, a switching transistor Tr105 is turned on. In contrast, when the timing generator sets the signal PTS to inactive, a capacitive element C104 holds a signal output from the differential amplifier AMP.

When a horizontal scanning circuit (not illustrated) sets a signal PH to active, switching transistors Tr106 and Tr107 are both turned on. As a result, signals respectively held by the capacitive elements C103 and C104 are output to the amplifier SAMP provided outside the CDS circuit 50 in each column. The amplifier SAMP outputs, as an output signal, a signal obtained by amplifying the difference between the signals respectively held by the capacitative elements C103 and C104.

Figure 2:
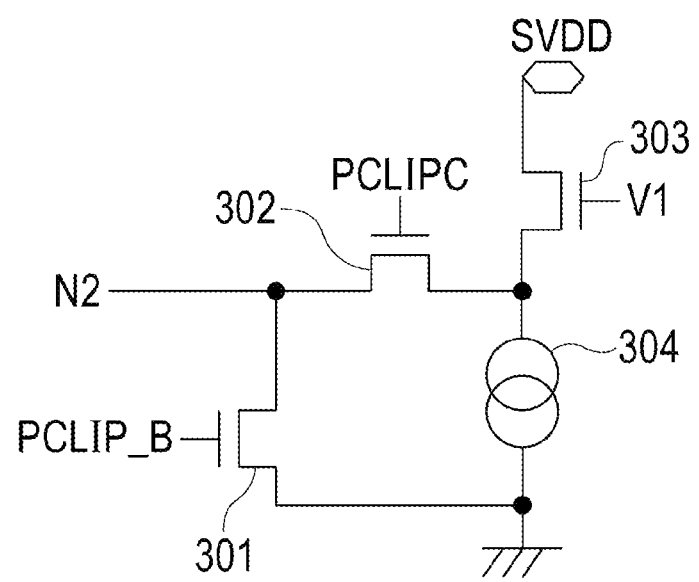
FIG. 2 is a diagram illustrating an example of a configuration of a shift unit.

Next, the configuration of the shift unit 30 will be described with reference to FIG. 2. FIG. 2 is a circuit diagram of the shift unit 30.

The shift unit 30 includes switching transistors 301 and 302, a source follower (SF) transistor 303, and a current source 304. All of the switching transistors 301 and 302, and the SF transistor 303 are NMOS transistors.

The switching transistor 301 is turned on when a signal PCLIP_B is high, whereby the switching transistor 301 supplies, to the second node N2, a GND electric potential being an electric potential of a GND line.

The switching transistors 301 and 302 are exclusively turned on, and the switching transistor 302 is turned on when a signal PCLIPC is active. The SF transistor 303 performs a source follower operation in conjunction with the current source 304. Through the source follower operation, the SF transistor 303 supplies, to the second node N2, an electric potential that is based on an electric potential V1. At this time, the switching transistor 301 is turned off.

FIG. 3 is a timing chart illustrating an operation of the imaging apparatus 100 according to the present exemplary embodiment. In FIG. 3, "FD", "N1", and "N2" represent electric potentials of respective nodes illustrated in FIG. 1A. "PRES", "PTX", "PCLIP", "PCLIP_B", "PCLIPL", and "PCLIPC" represent respective signals illustrated in FIGS. 1A and 2.

First, the description will be given of an operation performed in a case in which strong light such as solar light does not enter a readout pixel.

In a period T1, a vertical scan circuit (not illustrated) outputs an active signal PRES to the reset transistor 102. Accordingly, the reset transistor 102 resets the charge-voltage converter FD in the readout pixel to an electric potential that is based on the electric potential VRESH. Then, a timing generator (not illustrated) outputs an active signal PCLIP to the switching transistor 108. The switching transistor 108 is thereby turned on.

At this time, a reset-level voltage VL1res to be transferred via the vertical signal line L1 in a state in which the charge-voltage converter FD is reset is represented by:

$$VL1res = VRESH - Vth0 - Vth1 - \Delta ov1 \quad (1),$$

where Vth0 indicates a threshold voltage of the reset transistor 102, Vth1 indicates a threshold voltage of the amplification transistor 103, and $\Delta ov1$ indicates an over-drive voltage of the amplification transistor 103. The over-drive voltage $\Delta ov1$ is a voltage determined by the characteristic of the amplification transistor 103 and the current value of a current supplied from the current source 112.

The amplification transistor 103 outputs, to the vertical signal line L1, a noise-level signal that is based on an electric potential of the charge-voltage converter FD released from the reset. If a signal PCLIP becomes an active-level signal, the electric potential of the first node N1 becomes substantially equal to a noise-level electric potential output to the vertical signal line L1. In the present exemplary embodiment, the noise level is assumed to be equal to the reset level for ease of description.

In addition, in the period T1, the signal PCLIP_B is active, and accordingly, the electric potential of the second node N2 is the GND electric potential. The first node N1 is electrically connected to the gate of the NMOS transistor 104, and the voltage held by the holding capacitance 40 is applied to the gate of the NMOS transistor 104.

In a period T2, the shift unit 30 increases the electric potential of the second node N2 from the GND electric potential to the electric potential V1. The amount of rise $\Delta VN2$ of the electric potential of the second node N2 is represented by:

$$\Delta VN2 = V1 \quad (2).$$

As the electric potential of the second node N2 rises, the electric potential of the first node N1 also rises. The amount of rise $\Delta VN1$ of the electric potential of the first node N1 is represented by:

$$\Delta VN1 = K \times \Delta VN2 \quad (3).$$

"K" indicates a value determined by the capacitance value of the holding capacitance 40 and the capacitance value of a parasitic capacitance attached to the first node N1. This parasitic capacitance is, for example, a capacitance between a gate and a source or between a gate and a drain of each of the NMOS transistor 104, and the switching transistors 108 and 109.

As the capacitance value of the holding capacitance 40 becomes larger with respect to the parasitic capacitance attached to the first node N1, "K" becomes a smaller value.

Thus, the electric potential VN1 of the first node N1 is represented by:

$$VN1 = VRESH - Vth0 - Vth1 - \Delta ov1 + \Delta VN1 \quad (4).$$

In the period T2, the CDS circuit 50 receives an active signal PTN to hold a noise-level signal transferred via the vertical signal line L1 from the pixel 10.

In a period T3, the imaging apparatus 100 performs an operation for the CDS circuit 50 holding an optical signal of the pixel 10. In response to an active signal PCLIPL, the switching transistor 109 is turned on. Accordingly, the electric potential of the first node N1 becomes an electric potential VCLIPL. This electric potential VCLIPL is an electric potential that can prevent the current source 112 from being cut off when the electric potential of the vertical signal line L1 becomes lower than a predetermined value. In addition, the electric potential VCLIPL is an electric potential smaller than the electric potential of the first node N1 that is obtained when the CDS circuit 50 performs sampling of a noise-level signal in the period T2. Thus, the electric potential of the vertical signal line L1 is clipped to an electric potential represented by:

$$VCLIPL - Vth2 - \Delta ov2,$$

where Vth2 indicates a threshold voltage of the NMOS transistor 104, and $\Delta ov2$ indicates an over-drive voltage of the NMOS transistor 104.

In addition, in the period T3, the signal PCLIPC is inactive. As a result, the second node N2 is in an electrically-floating state. In other words, the second node N2 is in a state of being separated from a means for supplying a fixed electric potential. Thus, the electric potential of the second node N2 changes in accordance with the change of the electric potential of the first node N1.

The amount of change $\Delta VN1$ (T3) from an electric potential VN1 in the period T2 to an electric potential VN1 in the period T3 is represented by:

$$\Delta VN1(T3) = VL1res + \Delta VN1 - VCLIPL \quad (5).$$

In accordance with the variation in the electric potential of the first node N1, the electric potential of the second node N2 also varies.

The electric potential of the second node N2 according to the electric potential change amount $\Delta VN1$ (T3) is represented by:

$$VN2(T3)=V1-K'\times\Delta VN1(T3) \quad (6),$$

where "K'" indicates a value determined by the capacitance value of the holding capacitance 40 and the capacitance value of a parasitic capacitance attached to the second node N2. As the capacitance value of the holding capacitance 40 becomes larger with respect to the parasitic capacitance attached to the second node N2, "K'" becomes a smaller value.

In one embodiment, this operation is performed in a state in which a relation $V1>K'\times\Delta VN1$ (T3) is maintained for the following reason. If $V1<K'\times\Delta VN1$, in the period T3, the electric potential of the second node N2 has a negative value. If the electric potential of the second node N2 has a negative value, a forward bias is generated at a PN junction of a diffusion layer of a source or a drain of each of the switching transistors 301 and 302. As a result, a bias current may flow in the forward direction of the PN junction.

In the imaging apparatus of Japanese Patent Application Laid-Open No. 2009-194569, this signal PTX is set to active, and then, the electric potential of the second node N2 is reset to the GND electric potential. By the reset of the second node N2, a charge/discharge current according to an electric potential difference represented by (VL1res–VCLIPL) and the capacitance value of the holding capacitance 40 flows from the holding capacitance 40 to a supply line of the power supply SVDD and a supply line of the GND electric potential, which are power supply lines.

In contrast, in the present exemplary embodiment, during a period from when the signal PTX is set to active to when the signal PTS is set to active and the signal PTS is set to inactive, the second node N2 is in the electrically-floating state. As a result, the charge/discharge current that flows from the holding capacitance 40 to the supply line of the power supply SVDD and the supply line of the GND electric potential, which are power supply lines, has a current value K' times (K'<1) as large as a charge/discharge current that flows in a case in which the electric potential of the second node N2 is reset to the GND electric potential after the signal PTX is set to active. In this manner, by reducing the charge/discharge current that flows from the holding capacitance 40 to the supply line of the power supply SVDD and the supply line of the GND electric potential, which are power supply lines, voltage fluctuations in the power supply SVDD and the GND electric potential can be reduced.

Next, the description will be given of an operation performed in the period T2 in a case in which the pixel 10 is irradiated with strong light such as solar light.

When the pixel 10 is irradiated with strong light such as solar light, the electric potential of the charge-voltage converter FD decreases owing to charges overflowing from the photoelectric conversion unit PD. In response to this, a noise level transferred via the vertical signal line L1 also drops from a noise level to be originally output. In other words, the noise level comes close to an optical signal level. Accordingly, when CDS processing is performed, a difference between the optical signal and the noise level becomes smaller than a value to be originally obtained. This results in the generation of the high-brightness darkening phenomenon, in which an image looks dark.

At this time, assume that the shift unit 30 does not shift the electric potential of the second node N2 of the holding capacitance 40. In this case, the NMOS transistor 104 directly receives at the gate the electric potential of the vertical signal line L1 that is input from the switch unit 60, and clips the electric potential of the vertical signal line L1 to a clipping electric potential Vclip represented by the following Expression 7. This clipping electric potential Vclip is represented by:

$$Vclip=VRESH-Vth0-Vth1-\Delta ov1-Vth2-\Delta ov2 \quad (7),$$

where Vth2 indicates a threshold voltage of the NMOS transistor 104, and $\Delta ov2$ indicates an over-drive voltage of the NMOS transistor 104. That is, the level of the clipping electric potential Vclip becomes lower than the reset level by "Vth2+$\Delta ov2$", as represented by:

$$Vclip=VL1res-(Vth2+\Delta ov2) \quad (8).$$

As represented by Expression 8, the difference between the reset level and the clipping electric potential is equal to or larger than the amount of voltage drop (Vth2) in the clipping unit 20. In other words, it is difficult to make the difference between the reset level and the clipping electric potential smaller than the amount of voltage drop in the clipping unit 20.

To the contrary, in the present exemplary embodiment, the shift unit 30 increases the electric potential of the second node N2 of the holding capacitance 40 by the amount of rise $\Delta VN2$ (refer to Expression 2). In this case, the NMOS transistor 104 receives at the gate an input electric potential increased by the amount of rise $\Delta VN1$ (refer to Expression 3) from the electric potential of the vertical signal line L1, and clips the electric potential of the vertical signal line L1 to a clipping electric potential VclipH represented by the following Expression 9. This clipping electric potential VclipH is represented by:

$$VclipH=VRESH-Vth0-Vth1-\Delta ov1+\Delta VN1-Vth2-\Delta ov2 \quad (9).$$

That is, the level of the clipping electric potential VclipH becomes lower than the reset level by "(Vth2+$\Delta ov2$)–$\Delta VN1$", as represented by:

$$VclipH=VL1res-\{(Vth2+\Delta ov2)-\Delta VN1\} \quad (10).$$

In one embodiment, the lower limit of "(Vth2+$\Delta ov2$)–$\Delta VN1$" is 0, at which the values of VL1res and VclipH match each other. In addition, the shift unit 30 operates so that "(Vth2+$\Delta ov2$)–$\Delta VN1$" becomes smaller than Vth2. This condition is represented by:

$$0\leq(Vth2+\Delta ov2)-\Delta VN1<Vth2 \quad (11).$$

That is, if an electric potential increased by the amount of rise $\Delta VN1$ which satisfies:

$$\Delta ov2<\Delta VN1\leq Vth2+\Delta ov2 \quad (12)$$

is input to the gate of the NMOS transistor 104, the difference between the reset level and the clipping electric potential can be made smaller than the amount of voltage drop in the clipping unit 20.

In other words, from Expressions 3 and 12, if the shift unit 30 increases the electric potential of the second node N2 of the holding capacitance 40 by the amount of rise $\Delta VN2$ which satisfies:

$$\Delta ov2/K<\Delta VN2\leq(Vth2+\Delta ov2)/K \quad (13),$$

the difference between the reset level and the clipping electric potential can be made smaller than the amount of voltage drop in the clipping unit 20. An operation performed in the period T3 differs from the above-described normal operation in that the electric potential of the vertical signal line L1 is clipped to a clipping electric potential represented by:

VCLIPL−Vth2−Δov2.

As described above, the imaging apparatus of the present exemplary embodiment can effectively suppress the generation of the high-brightness darkening phenomenon by making the difference between the reset level and the clipping electric potential smaller than the amount of voltage drop in the clipping unit 20 in the period T2.

In addition, the imaging apparatus of the present exemplary embodiment shifts the electric potential of the vertical signal line L1 for each pixel to give the shifted electric potential to the gate of the NMOS transistor 104. As a result, the imaging apparatus of the present exemplary embodiment has a technical effect of being insusceptible to characteristic variations among the pixels 10 (for example, fluctuations in threshold voltage among the pixels 10 of the amplification transistor 103).

As described above, by reducing a charge/discharge current that flows from the holding capacitance 40 to the supply line of the power supply SVDD and the supply line of the GND electric potential, which are power supply lines, the imaging apparatus of the present exemplary embodiment can reduce voltage fluctuations in the supply line of the power supply SVDD and the supply line of the GND electric potential, which are power supply lines.

In addition, in the present exemplary embodiment, a readout pixel is selected using the electric potential VRESH and the electric potential VRESL. If the pixel 10 includes, in an electrical path between the amplification transistor 103 and the vertical signal line L1, a selection transistor for switching the state of the electrical path between a conductive state and a non-conductive state, the technical effect as described in the present exemplary embodiment can be achieved. In the present exemplary embodiment, in the power supply VRES of the pixel 10, a line for supplying the electric potential VRESH and a line of the power supply SVDD of the clipping unit 20 are connected. In a case in which the pixel 10 includes the selection transistor, the power supply VRES connected to the reset transistor 102 and the amplification transistor 103 of the pixel 10 is assumed to be a power supply line shared with the power supply SVDD of the clipping unit 20. In other words, the reset transistor 102 and the amplification transistor 103 of the pixel 10 are assumed to be electrically connected to the NMOS transistor 104 of the clipping unit 20 via the line for supplying the power supply SVDD.

In addition, the imaging apparatus of the present exemplary embodiment sets the signal PCLIPL to active, and shifts the electric potential of the first node N1 from a first electric potential to a second electric potential during a period in which the signal PTX is set to active. Nevertheless, it is sufficient that the electric potential of the first node N1 is shifted from the first electric potential to the second electric potential during a period from a timing at which the signal PTN is switched from active to inactive to a timing at which the signal PTS is switched from active to inactive. In addition, it is sufficient that the second node N2 is in the electrically-floating state during a period from when the electric potential of the first node N1 starts to be shifted from the first electric potential to the second electric potential to a timing at which the signal PTS is switched from active to inactive and a signal holding unit holds an optical signal. After the signal PTN is switched to inactive, the second node N2 may enter the electrically-floating state before the electric potential of the first node N1 starts to be shifted.

In addition, in the present exemplary embodiment, the description has been given of an example in which the CDS circuit 50 includes the differential amplifier AMP. The present exemplary embodiment is, however, not limited to this example, and the CDS circuit 50 may not be necessarily provided with the differential amplifier AMP. In other words, it is sufficient that the CDS circuit 50 is configured to hold a noise-level signal and an optical signal.

In addition, the CDS circuit 50 serving as a signal holding unit may include an analog-to-digital (AD) conversion circuit. The AD conversion circuit includes a holding unit for holding a signal output to the vertical signal line L1, and an AD conversion unit for converting the signal held by the holding unit into a digital signal. In a case in which the CDS circuit 50 includes the AD conversion circuit, the signal PTN serves as a signal for controlling an operation in which an input unit of the AD conversion circuit holds a noise-level signal output to the vertical signal line L1. In addition, in a case in which the CDS circuit 50 includes the AD conversion circuit, the signal PTS serves as a signal for controlling an operation in which the input unit of the AD conversion circuit holds an optical signal output to the vertical signal line L1. The AD conversion unit can employ various AD conversion formats. For example, the AD conversion unit may perform lamp-type AD conversion in which a digital signal is generated as follows. First, a lamp signal whose electric potential changes in accordance with the lapse of time is compared with an analog signal held by the holding unit. Then, a digital signal is generated based on the length of a period from when the comparison is started to when the magnitude relation between the lamp signal and the analog signal reverses. Beside the lamp-type AD conversion, AD conversion performed by the AD conversion unit can also be of a successive-approximation type, a delta sigma type, a double integral type, and the like.

In addition, in the present exemplary embodiment, the shift unit 30 shifts the electric potential of the second node N2 when shifting from the period T1 to the period T2. Nevertheless, the shift unit 30 may not necessarily shift the electric potential of the second node N2 as long as the amount of voltage drop in the clipping unit 20 affects, in an allowable manner, an optical-signal outputtable range in the vertical signal line L1.

Second Exemplary Embodiment

An imaging apparatus of the present exemplary embodiment will be described with a focus placed on points different from the first exemplary embodiment. The circuit diagram of the imaging apparatus is the same as FIG. 1A described in the first exemplary embodiment. In the imaging apparatus of the present exemplary embodiment, an NMOS transistor 104 is of a depression type, and Vth of the NMOS transistor 104 has a negative value.

Figure 4:
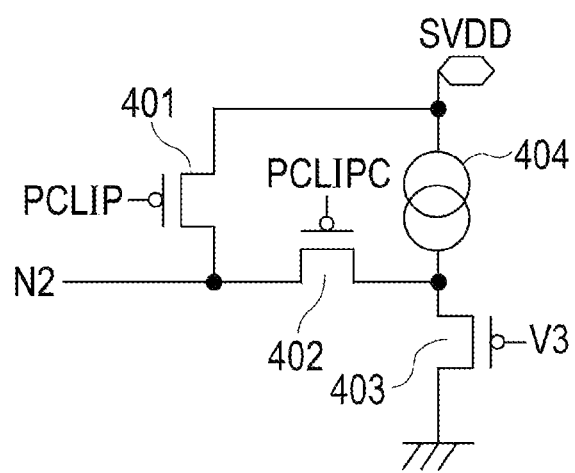
FIG. 4 is a diagram illustrating another example of a configuration of a shift unit.

FIG. 4 is a circuit diagram illustrating a configuration of a shift unit 30 according to the present exemplary embodiment.

The shift unit 30 includes switching transistors 401 and 402, an SF transistor 403, and a current source 404. All of the switching transistors 401 and 402, and the SF transistor 403 are PMOS transistors.

A signal similar to the signal PCLIP supplied to the switching transistor 108 is input to the gate of the switching transistor 401. The switching transistor 401 is turned on when the signal PCLIP is inactive. In response to this, the electric potential of the power supply SVDD is applied to the second node N2.

The switching transistor 402 is turned on when the signal PCLIPC is inactive. In response to this, the SF transistor 403 performs a source follower operation in conjunction with the current source 404. Accordingly, an electric potential that is based on an electric potential V3 input to the gate of the SF transistor 403 is supplied to the second node N2.

Figure 5:
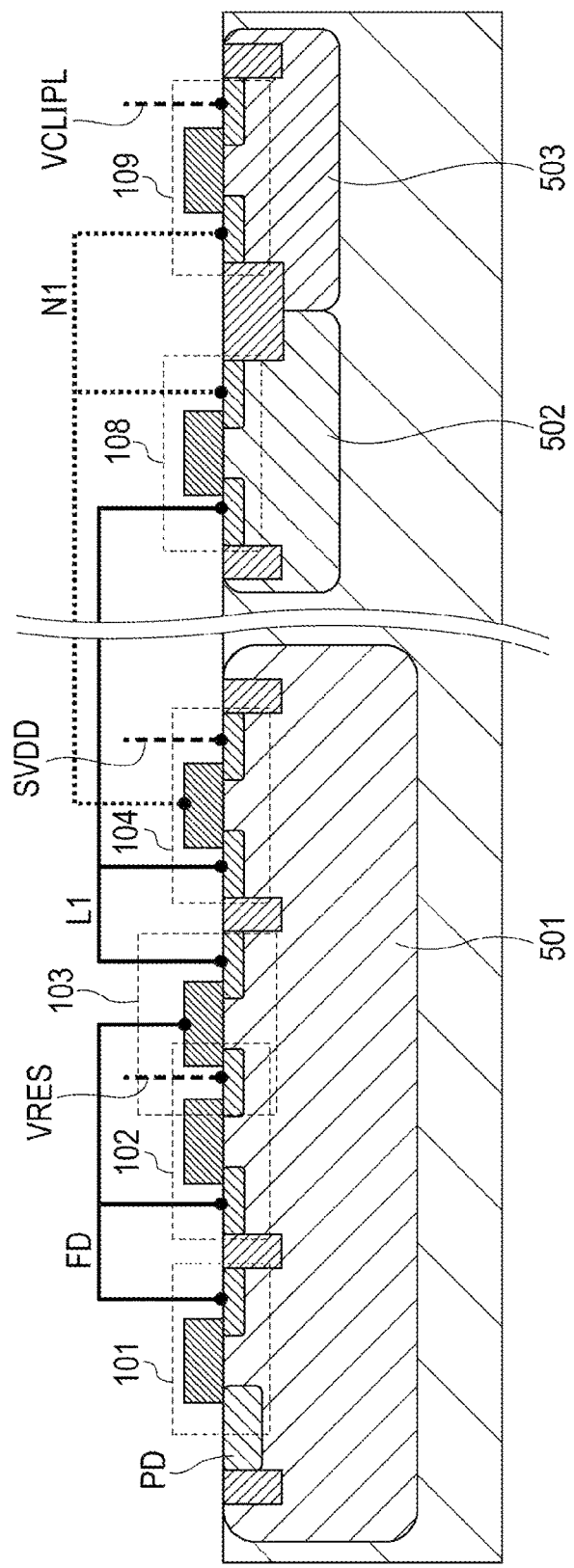
FIG. 5 is a diagram illustrating an example of a cross section of a configuration of an imaging apparatus.

FIG. 5 is a cross-sectional diagram of an imaging apparatus 100 according to the present exemplary embodiment. The reference numerals indicated in FIG. 5 respectively correspond to those indicated in FIG. 1A. The photoelectric conversion unit PD, the transfer unit 101, the charge-voltage converter FD, the amplification transistor (output unit) 103, and the reset transistor 102 of the pixel 10 are formed within a pixel P well region 501. In FIG. 5, only one pixel is illustrated. Actually, a plurality of pixels 10 is two-dimensionally arrayed in a pixel region. In a peripheral circuit region distant from the pixel region, a source and a drain of the switching transistor 108 are formed within an N well 502. In the peripheral circuit region, the CDS circuit 50, a vertical scan circuit (not illustrated), and a horizontal scanning circuit (not illustrated) are provided. In addition, respective sources and drains of the switching transistor 109 and the NMOS transistor 104 are formed within a P well region 503. Ion species for making a channel region 1040 of the NMOS transistor 104 N-type are injected into the channel region 1040. As a result, Vth of the NMOS transistor 104 has a lower value than Vth of the switching transistor 109.

Figure 6:
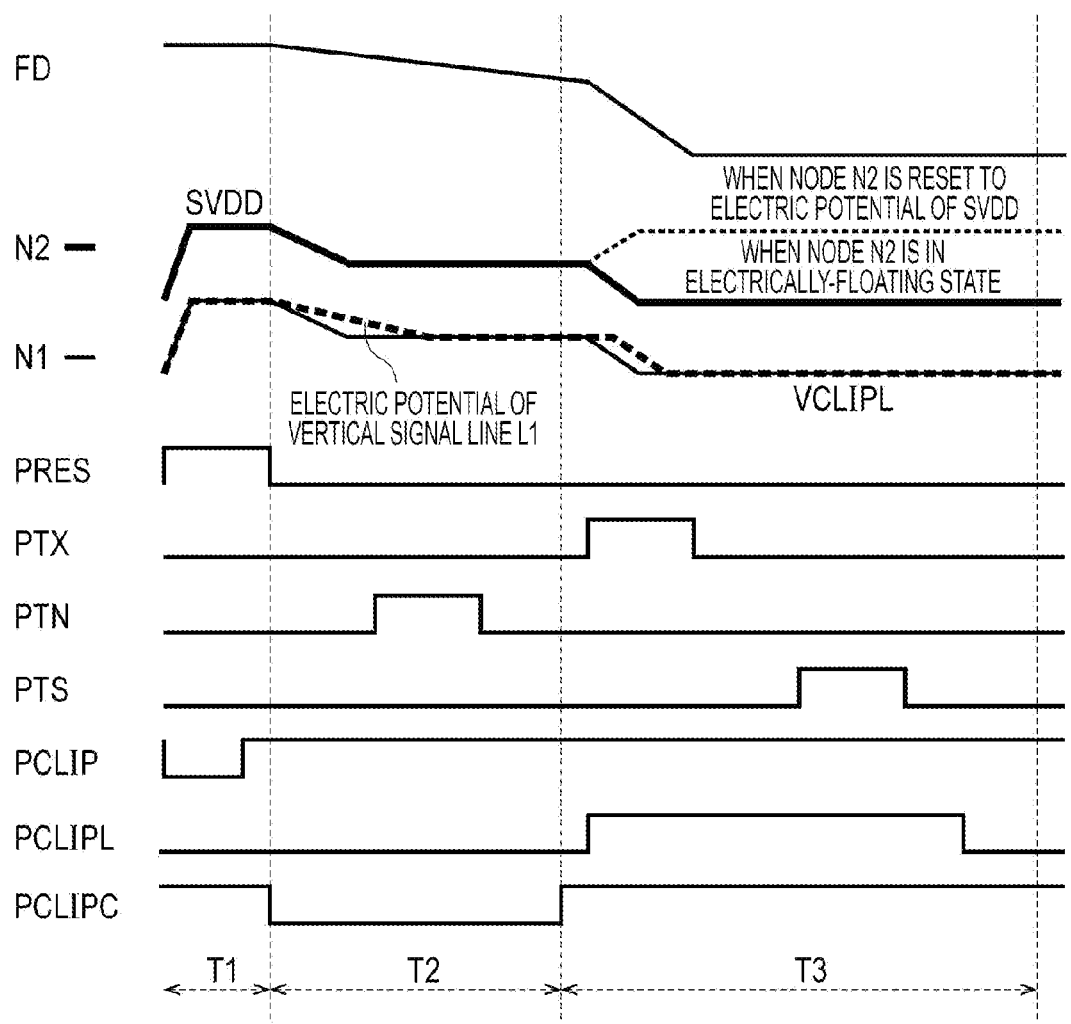
FIG. 6 is a diagram illustrating another example of an operation of an imaging apparatus.

FIG. 6 is a timing chart illustrating an operation performed by the imaging apparatus 100 according to the present exemplary embodiment. The signal PCLIPC indicated in FIG. 6 is a signal obtained by inverting the signal PCLIPC indicated in FIG. 3.

First, the description will be given of a normal operation performed in a case in which pixel 10 is not irradiated with strong light such as solar light.

In a period T1, the electric potential of the second node N2 is set to an electric potential of the power supply SVDD.

In a period T2, the electric potential of the second node N2 is decreased from the electric potential of the power supply SVDD to the electric potential based on the electric potential V3. The amount of drop of the electric potential of the second node N2 is represented by:

$$\Delta VN2 = V3 \qquad (2\text{-}2).$$

In accordance with the drop in the electric potential of the second node N2, the electric potential of the first node N1 also drops. The amount of drop of the electric potential of the first node N1 is represented by:

$$\Delta VN1 = K \times \Delta VN2 \qquad (2\text{-}3),$$

where "K" indicates a constant of proportionality. Accordingly, the electric potential VN1 of the first node N1 is represented by:

$$VN1 = VRESH - Vth0 - Vth1 - \Delta ov1 - \Delta VN1 \qquad (2\text{-}4).$$

In a period T3, the electric potential of the second node N2 is in an electrically-floating state. Accordingly, similarly to the first exemplary embodiment, the electric potential of the second node N2 changes by the amount of change of the electric potential of the first node N1. An electric potential change amount of the electric potential VN1 of the first node N1 is represented by:

$$\Delta VN1(T3) = VL1res - \Delta VN1 - VCLIPL \qquad (2\text{-}5).$$

In accordance with the variation in the electric potential of the first node N1, the electric potential of the second node N2 also varies. The electric potential of the second node N2 is represented by:

$$VN2(T3) = V1 - K \times \Delta VN1(T3) \qquad (2\text{-}6).$$

In the imaging apparatus of the present exemplary embodiment as well, similarly to the first exemplary embodiment, the second node N2 is in the electrically-floating state during a period from when the electric potential of the first node N1 starts to be shifted from the first electric potential to the second electric potential to when the signal PTS is switched from active to inactive and a signal holding unit holds an optical signal. As a result, the same technical effect as that described in the first exemplary embodiment can be obtained also in the imaging apparatus of the second exemplary embodiment.

Next, the description will be given of an operation performed in the period T2 in a case in which the pixel 10 is irradiated with strong light such as solar light.

When the pixel 10 is irradiated with strong light such as solar light, the electric potential of the charge-voltage converter FD decreases owing to charges overflowing from the photoelectric conversion unit PD. In response to this, a noise level transferred via the vertical signal line L1 also drops from the reset level.

At this time, assume that the shift unit 30 does not shift the electric potential of the second node N2 of the holding capacitance 40. In this case, the NMOS transistor 104 directly receives at the gate the electric potential of the vertical signal line L1 that is input from the switch unit 60, and clips the electric potential of the vertical signal line L1 to a clipping electric potential Vclip represented by the following Expression 2-7. This clipping electric potential Vclip is represented by:

$$Vclip = VRESH - Vth0 - Vth1 - \Delta ov1 - Vth2 \text{ (threshold voltage of the NMOS transistor 104)} - \Delta ov2 \text{ (over-drive voltage of the NMOS transistor 104)} \qquad (2\text{-}7).$$

That is, the level of the clipping electric potential Vclip becomes lower than the reset level by "Vth2+Δov2", as represented by:

$$Vclip = VL1res - (Vth2 + \Delta ov2) \qquad (2\text{-}8).$$

Nevertheless, Vth of the NMOS transistor 104 of the present exemplary embodiment has a negative value. In addition, in order to increase the driving force of the NMOS transistor 104, for example, if a channel width W of the NMOS transistor 104 is increased to be approximately ten times as large as that of the amplification transistor 103, Δov2 becomes approximately 0. Accordingly, the clipping electric potential becomes higher than the reset level as represented by:

$$VL1res \leq Vclip.$$

As a result, the NMOS transistor 104 clips the electric potential of the vertical signal line L1 in a state in which the electric potential of the vertical signal line L1 is higher than the reset level. Consequently, an appropriate reset level is not output, and the accuracy of the CDS performed by the CDS circuit 50 decreases.

Thus, in the present exemplary embodiment, the shift unit 30 decreases the electric potential of the second node N2 of the holding capacitance 40 by ΔVN2 (refer to Expression 2-2). In this case, the NMOS transistor 104 receives at the gate an input electric potential lower than the electric potential of the vertical signal line L1 by ΔVN1 (refer to Expression 2-3), and clips the electric potential of the vertical signal line L1 to a clipping electric potential VclipH represented by the following Expression 2-9. This clipping electric potential VclipH is represented by:

$$VclipH = VRESH - Vth0 - Vth1 - \Delta ov1 - \Delta VN1 - Vth2 - \Delta ov2 \quad (2\text{-}9).$$

That is, the level of the clipping electric potential VclipH becomes lower than the reset level by "$(Vth2+\Delta ov2)+\Delta VN1$" as represented by:

$$VclipH = VL1res - \{(Vth2+\Delta ov2)+\Delta VN1\} \quad (2\text{-}10).$$

In one embodiment, the lower limit of "$(Vth2+\Delta ov2)+\Delta VN1$" is 0, at which the values of VL1res and VclipH match each other. This condition is represented by:

$$0 \leq (Vth2+\Delta ov2)+\Delta VN1 \quad (2\text{-}11).$$

That is, if an electric potential decreased by $\Delta VN1$ which satisfies:

$$-(Vth2+\Delta ov2) \leq \Delta VN1 \quad (2\text{-}12)$$

is input to the gate of the NMOS transistor 104, the clipping electric potential can be made lower than the reset level.

In other words, from Expressions 2-3 and 2-12, if the shift unit 30 decreases the electric potential of the second node N2 of the holding capacitance 40 by $\Delta VN2$ which satisfies:

$$-(Vth2+\Delta ov2)/K \leq \Delta VN2 \quad 2\text{-}13,$$

the clipping electric potential can be made lower than the reset level. If $\Delta VN2$ is too large, the electric potential difference between the reset level and the clipping electric potential increases. As a result, it becomes difficult to effectively obtain the technical effect of suppressing the generation of the high-brightness darkening phenomenon. Thus, the imaging apparatus of the present exemplary embodiment sets $\Delta VN2$ in such a manner that the following condition is satisfied:

$$-(Vth2+\Delta ov2)/K \approx \Delta VN2.$$

As described above, if the NMOS transistor 104 is of a depression type, the electric potential of the second node N2 is decreased in the period T2. The direction in which the electric potential is decreased is the same as the direction in which the electric potential of the charge-voltage converter FD changes owing to charges transferred to the charge-voltage converter FD, as illustrated in FIG. 5. As a result, in the imaging apparatus of the present exemplary embodiment, the clipping unit 20 clips the electric potential of the vertical signal line L1 in a case in which the electric potential of the vertical signal line L1 is lower than the reset level. In addition, the imaging apparatus of the present exemplary embodiment sets $\Delta VN2$ in such a manner that the following condition is satisfied:

$$-(Vth2+\Delta ov2)/K \approx \Delta VN2.$$

In this manner, by reducing the difference between the reset level and the clipping electric potential, the generation of the high-brightness darkening phenomenon can be suppressed.

In addition, as described above, the electric potential of the second node N2 is in the electrically-floating state during a period from when the electric potential of the first node N1 starts to be shifted from the first electric potential to the second electric potential to when the signal PTS is switched from active to inactive and the signal holding unit holds an optical signal. As a result, in the imaging apparatus of the present exemplary embodiment as well, the same technical effect as that in the imaging apparatus of the first exemplary embodiment can be obtained.

Third Exemplary Embodiment

An imaging apparatus of the present exemplary embodiment will be described with a focus placed on points different from the second exemplary embodiment. The configurations of an imaging apparatus 100 and a shift unit 30 according to the present exemplary embodiment are the same as those illustrated in FIGS. 1A and 4, as described in the second exemplary embodiment.

Figure 7:
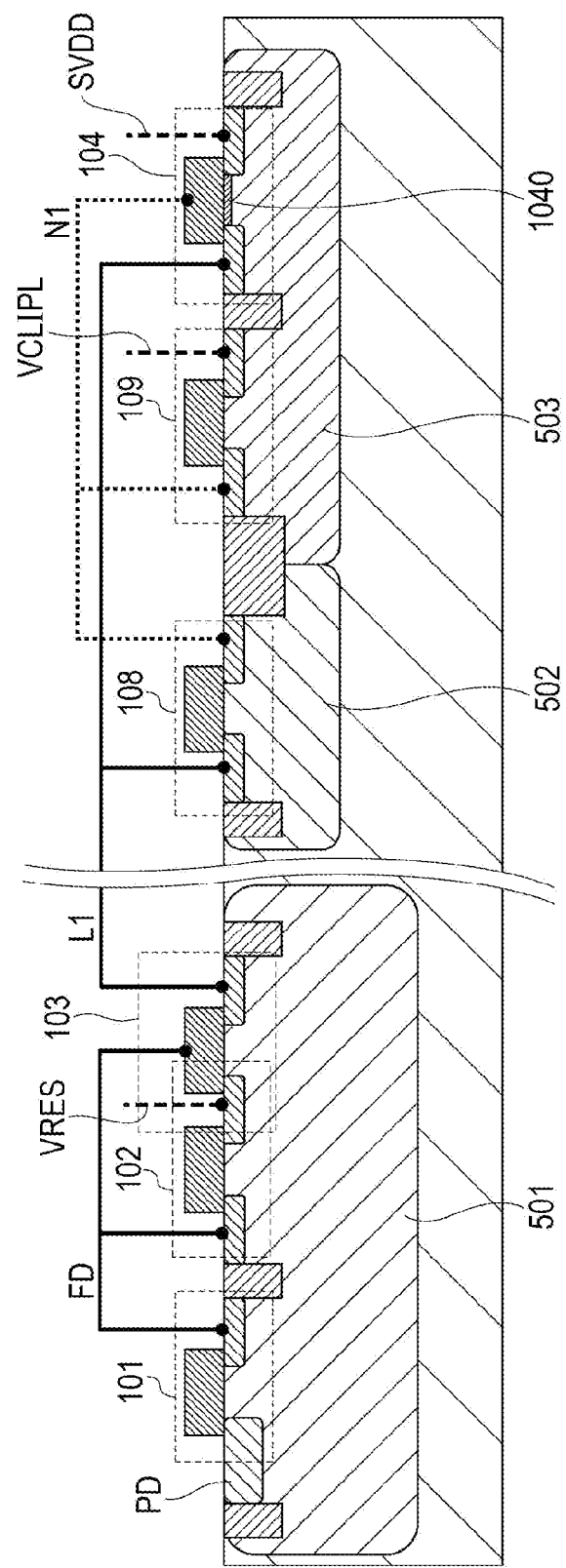
FIG. 7 is a diagram illustrating an example of a cross section of a configuration of an imaging apparatus.

FIG. 7 is a cross-sectional diagram of the imaging apparatus 100 according to the present exemplary embodiment. The reference numerals indicated in FIG. 7 respectively correspond to those indicated in FIG. 1A. The difference from FIG. 5 described in the second exemplary embodiment lies in that the source and the drain of the NMOS transistor 104 are formed within the pixel P well region 501.

In FIG. 7, only one pixel is illustrated. Actually, in a pixel region where a plurality of pixels 10 is two-dimensionally arrayed, the NMOS transistor 104 is arranged at an end portion neighboring the peripheral circuit region.

In some cases, threshold voltages of transistors may be made different between the pixel region and the peripheral circuit region. If the NMOS transistor 104 is formed within the P well region 503, the threshold voltage of the amplification transistor 103 tends to be smaller than the threshold voltage of the NMOS transistor 104 formed within the peripheral circuit region. This is because the reset level of the electric potential of the vertical signal line L1 is given by Expression 1. As the threshold voltage of the amplification transistor 103 increases, the electric potential of the reset level that is output to the vertical signal line L1 decreases. In other words, the upper limit of the signal level of the optical signal output to the vertical signal line L1 decreases. In addition, the lower limit of the signal level of the optical signal output to the vertical signal line L1 is an electric potential at which the current source 112 is not cut off. Accordingly, if the electric potential of the reset level of the vertical signal line L1 decreases, the range of the optical signal that can be output to the vertical signal line L1 is made smaller. Thus, in order to ensure the range of the optical signal that can be output to the vertical signal line L1, the threshold voltage of the amplification transistor 103 tends to be set smaller than the threshold voltage of the transistor provided in the peripheral circuit region. For this reason, the threshold voltage of the NMOS transistor 104 formed within the pixel P well region 501 tends to be smaller than that in a case in which the NMOS transistor 104 is formed within the P well region 503.

By reducing the threshold voltage of the NMOS transistor 104, the shifted electric potential of the second node N2 that is set by the shift unit 30 can be made smaller. As represented by Expression 10, as Vth2 of the NMOS transistor 104 decreases, $\Delta VN1$ can be made smaller. By decreasing the shift amount of the electric potential of the second node N2 in the period T2, in the operation in which the CDS circuit 50 performs sampling of the reset level, the respective fluctuations of the power supply SVDD and the GND electric potential of the shift unit 30 can be suppressed. As a result, the decrease in the accuracy of the CDS operation can be suppressed, so that the decrease in image quality can be suppressed. In addition, the power supply SVDD supplies an electric potential to the NMOS transistor 104. Accordingly, if electric potential fluctuations of the power supply SVDD are decreased, the decrease in the accuracy of the clipping operation of the clipping unit 20 can be suppressed.

In the imaging apparatus of the present exemplary embodiment, the NMOS transistor 104 of the clipping unit 20 is formed within the pixel P well region 501. During the manufacture of the imaging apparatus, in some cases, the pixel region and the peripheral circuit region may be separately manufactured. Thus, in a case in which the NMOS transistor 104 is formed in the P well region 503, the NMOS transistor 104 and the amplification transistor 103 are separately manufactured. Consequently, the influence of manufacturing variations among the NMOS transistors 104 that the NMOS transistors 104 receive is likely to be different from the influence of manufacturing variations among the amplification transistors 103 that the amplification transistors 103 receive. On the other hand, in a case where the NMOS transistor 104 is formed within the pixel P well region 501 as in the present exemplary embodiment, the NMOS transistor 104 and the amplification transistor 103 can be formed in the same manufacturing process. Accordingly, the influence of manufacturing variations among the NMOS transistors 104 that the NMOS transistors 104 receive and the influence of manufacturing variations among the amplification transistors 103 that the amplification transistors 103 receive are likely to be uniform.

As a result, in the imaging apparatus of the present exemplary embodiment, the threshold voltage of the NMOS transistor 104 is likely to be closer to the threshold voltage of the amplification transistor 103, as compared with a case in which the NMOS transistor 104 is formed within the P well region 503. Accordingly, the imaging apparatus of the present exemplary embodiment can improve the accuracy of the clipping operation, as compared with a case in which the NMOS transistor 104 is formed within the P well region 503.

In addition, in the imaging apparatus of the present exemplary embodiment, the shift unit 30 is arranged in the peripheral circuit region, which is outside of the pixel P well region 501, and has a well separated from the pixel P well region 501. This can suppress electric potential fluctuations in the pixel P well region 501 that result from the shift unit 30 shifting the electric potential of the second node N2, as compared with a case in which the shift unit 30 is formed within the pixel P well region 501.

In addition, the imaging apparatus of the present exemplary embodiment can operate similarly to that of the second exemplary embodiment.

Fourth Exemplary Embodiment

Figure 8:
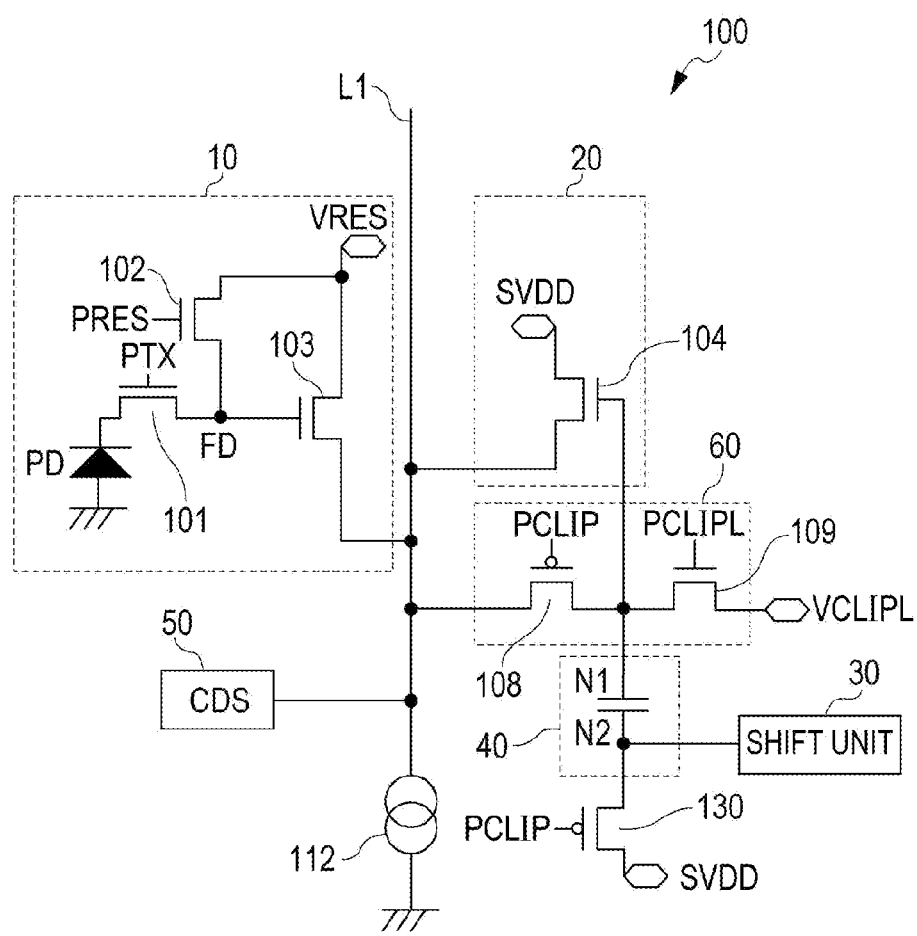
FIG. 8 is a diagram illustrating another example of a configuration of an imaging apparatus.

An imaging apparatus of the present exemplary embodiment will be described with a focus placed on points different from the first and the second exemplary embodiments. The imaging apparatus of the present exemplary embodiment will be described with reference to FIG. 8.

The imaging apparatus of the present exemplary embodiment includes a PMOS transistor 130 electrically connected to the second node N2. A node of one of a source and a drain of the PMOS transistor 130 is electrically connected to the power supply SVDD while a node of the other one of the source and the drain is electrically connected to the second node N2. In addition, the signal PCLIP is input to the gate of the PMOS transistor 130. The configuration of the shift unit 30 is the same as the configuration described in the second exemplary embodiment with reference to FIG. 4. When the PMOS transistor 130 is turned on, the electric potential of the second node N2 is set to an electric potential of the power supply SVDD. The second node N2 is electrically connected to the power supply SVDD via the PMOS transistor 130 serving as a switch. The PMOS transistor 130 and the shift unit 30 serving as an electric potential supply unit are in an electrically-parallel relation with respect to the second node N2. Furthermore, the switching transistor (PMOS transistor) 401 serving as a buffer and the PMOS transistor 130 serving as a switch are in an electrically-parallel relation with respect to the second node N2.

Figure 9:
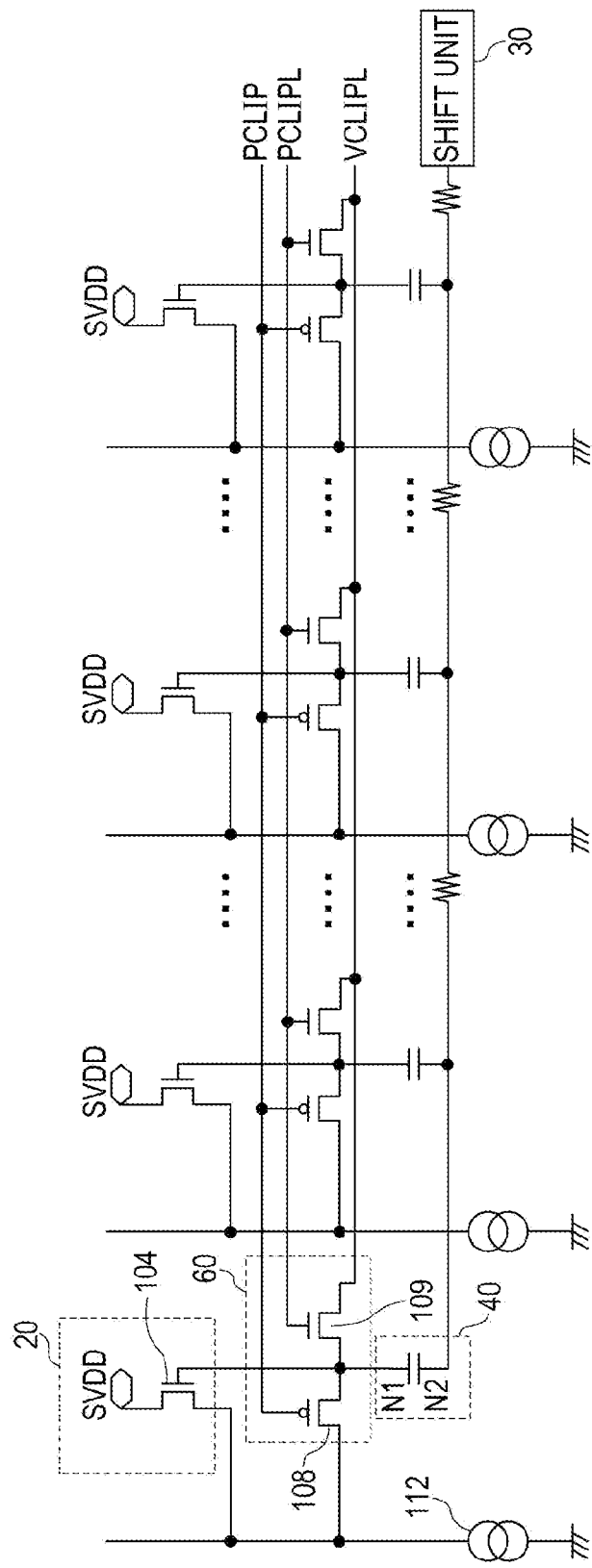
FIG. 9 is a diagram illustrating another example of a configuration of an imaging apparatus.

FIG. 9 is a diagram illustrating a configuration of the imaging apparatus described in the first exemplary embodiment with reference to FIG. 1A, which involves a plurality of columns of vertical signal lines L1. The reference numerals indicated in FIG. 9 respectively correspond to those indicated in FIG. 1A. In the imaging apparatus illustrated in FIG. 9, a plurality of clipping units 20, a plurality of holding capacitances 40, and a plurality of switch units 60 are arrayed respectively corresponding to the plurality of columns of vertical signal lines L1.

In addition, in the imaging apparatus illustrated in FIG. 9, a single shift unit 30 is arranged corresponding to the plurality of clipping units 20, the plurality of holding capacitances 40, and the plurality of the switch units 60.

Figure 10:
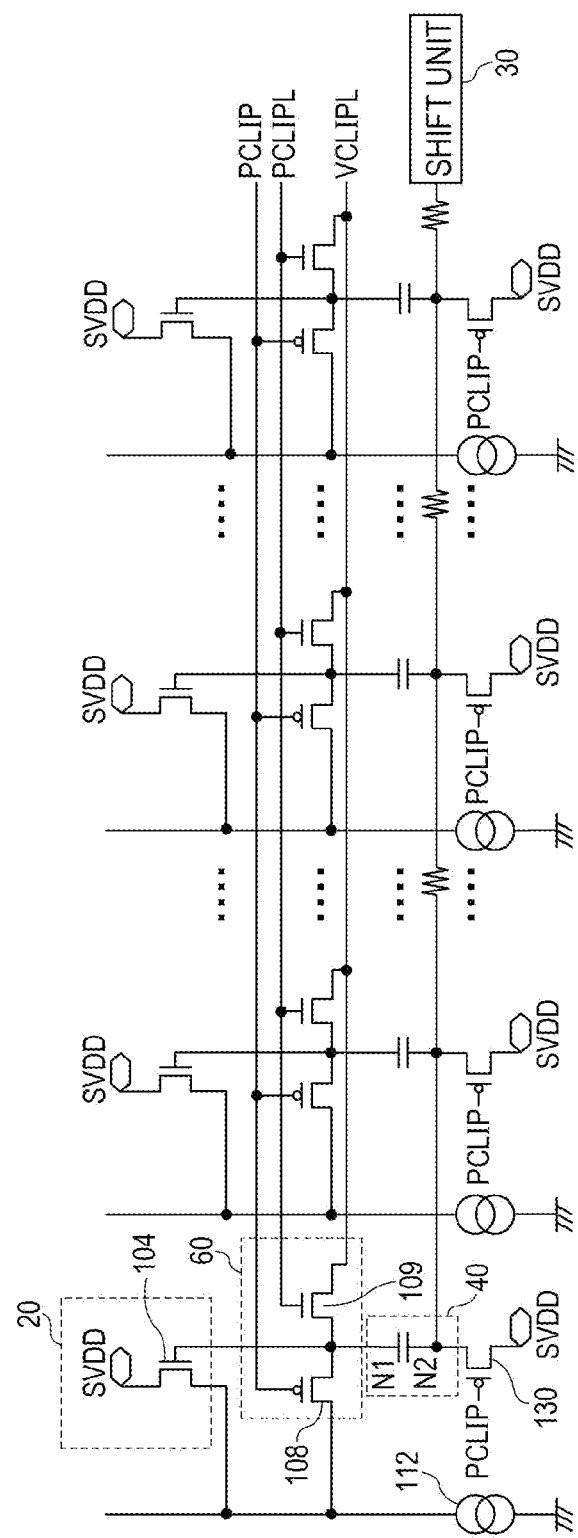
FIG. 10 is a diagram illustrating another example of a configuration of an imaging apparatus.

Next, FIG. 10 is a diagram illustrating a configuration of the imaging apparatus of the present exemplary embodiment, which involves a plurality of columns of vertical signal lines L1. The reference numerals indicated in FIG. 10 respectively correspond to those indicated in FIG. 8. The imaging apparatus of the present exemplary embodiment differs from the imaging apparatus illustrated in FIG. 9 in that a plurality of PMOS transistors 130 is arrayed respectively corresponding to the plurality of columns of vertical signal lines L1.

The operation performed by the imaging apparatus of the present exemplary embodiment is the same as the operation described in the second exemplary embodiment with reference to FIG. 6.

The electric potential of the second node N2 is set to an electric potential of the power supply SVDD in the period T1. In the period T3, the electric potential of the second node N2 is set to an electric potential represented by:

power supply SVDD−ΔVN2−K×(VL1res−(KΔVN2)−VCLIPL).

At the shift from the period T3 to the period T1, in which a next row is read out, the electric potential of the first node N1 varies by "VL1res−VCLIPL". Similarly, the electric potential of the second node N2 varies by "(1−K^2)×ΔVN2−K×(VL1res−VCLIPL)". The electric potential difference between the first node N1 and the second node N2 is represented by:

(VL1res−VCLIPL)−((1−K^2)ΔVN2−K(VL1res−VCLIPL)).

In this specification, the sign "^" indicates exponentiation. More specifically, "K^2" indicates K squared. This electric potential difference is generated in the clipping unit 20 in each column. Accordingly, a current, which is based on a voltage obtained by multiplying this electric potential difference generated in each column by the number of columns N of the vertical signal lines L1 to which the shift unit 30 is electrically connected, flows from the second node N2 to a supply line of the power supply SVDD and a supply line of the GND electric potential, which are power supply lines.

In the imaging apparatus illustrated in FIG. 9, the switching transistor 401 sets the electric potential of the second node N2 to the electric potential of the power supply SVDD in the period T1. This switching transistor 401 is shared by the plurality of columns of vertical signal lines L1. Thus, a period from when the signal PCLIP becomes active to when the second node N2 is statically settled to the electric potential of the power supply SVDD becomes longer as the second node N2 corresponds to the vertical signal line L1 more distant from the shift unit 30. Accordingly, in the imaging apparatus illustrated in FIG. 9, if the period T1 is set to a period until the first node N1 corresponding to the vertical signal line L1 distant from the shift unit 30 is statically settled to the electric potential of the power supply SVDD, it is difficult to speed up the imaging apparatus. In addition, as the imaging apparatus illustrated in FIG. 9 speeds up, the first node N1 corresponding to the vertical signal line L1 distant from the shift unit 30 becomes likely to shift from the period T1 to the period T2 earlier than being statically settled to the electric potential of the power supply SVDD. Accordingly, the clipping electric potential obtained by the clipping unit 20 corresponding to the vertical signal line L1 distant from the shift unit 30 varies. As a result, the imaging apparatus illustrated in FIG. 9 may not sufficiently suppress the high-brightness darkening phenomenon in some cases.

On the other hand, the imaging apparatus illustrated in FIG. 10 includes the PMOS transistors 130 for supplying the electric potentials of the power supplies SVDD to the respective second nodes N2 corresponding to the respective columns of the vertical signal lines L1. As a result, a period until the second node N2 corresponding to the vertical signal line L1 distant from the shift unit 30 is statically settled to the electric potential of the power supply SVDD can be shortened, as compared with the imaging apparatus illustrated in FIG. 9. The imaging apparatus illustrated in FIG. 10 can accordingly shorten the period T1 as compared with the imaging apparatus illustrated in FIG. 9. Thus, the imaging apparatus illustrated in FIG. 10 can speed up its operation. In addition, the imaging apparatus illustrated in FIG. 10 has such a technical effect that the high-brightness darkening phenomenon is likely to be suppressed as compared with the imaging apparatus illustrated in FIG. 9, even if the period T1 is shortened.

Fifth Exemplary Embodiment

Figure 11:
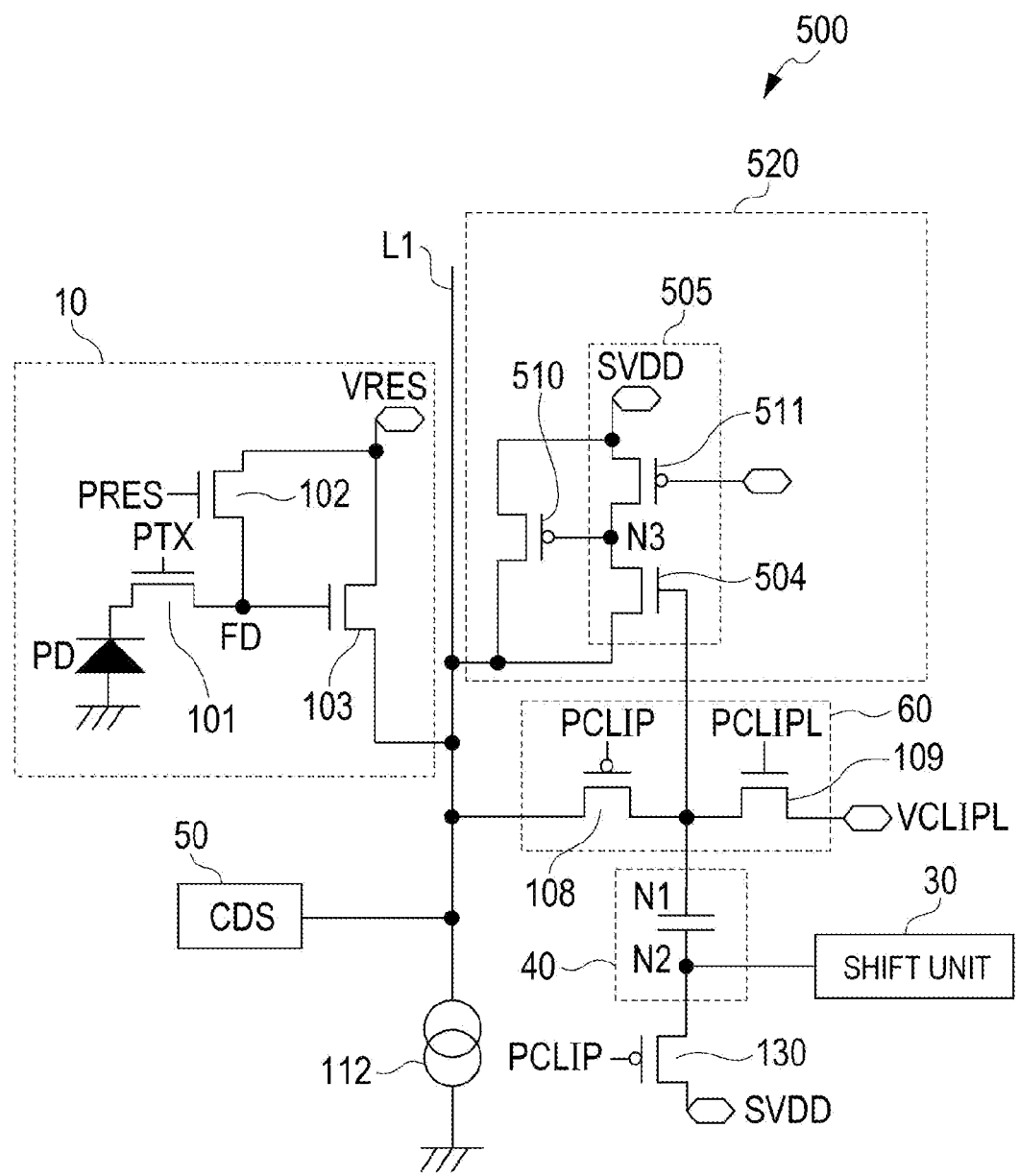
FIG. 11 is a diagram illustrating another example of a configuration of an imaging apparatus.

An imaging apparatus of the present exemplary embodiment will be described with a focus placed on points different from the fourth exemplary embodiment. FIG. 11 is a diagram illustrating a configuration of the imaging apparatus according to the present exemplary embodiment.

An imaging apparatus 500 includes a clipping unit 520. The clipping unit 520 includes a common-gate amplification circuit 505, and a PMOS transistor 510 which forms a common-source amplification circuit.

For example, the common-gate amplification circuit 505 and the PMOS transistor 510 can take a configuration as illustrated in FIG. 11.

The common-gate amplification circuit 505 includes a current source 511 and an NMOS transistor 504. The clipping unit 520 includes the PMOS transistor 510 having a common-source. The clipping unit 520 forms the common-source amplification circuit together with the current source 112 of the vertical signal line L1.

The current source 511 is formed from a PMOS transistor. This PMOS transistor has a gate electrically connected to a fixed electric potential (e.g., GND electric potential). In addition, one of a source and a drain of this PMOS transistor is electrically connected to the power supply SVDD. The other one of them is electrically connected the NMOS transistor 504 and the PMOS transistor 510 to be described below. The current source 511 supplies a current to the NMOS transistor 504.

The NMOS transistor 504 has a gate electrically connected to the first node N1 of the holding capacitance 40, and a source electrically connected to the vertical signal line L1 and a drain of the PMOS transistor 510. The NMOS transistor 504 has a drain electrically connected to the current source 511 and the gate of the PMOS transistor 510. The NMOS transistor 504 amplifies the amount of drop of the electric potential of the vertical signal line L1 (source) from a voltage (clipping electric potential) supplied to the gate. The NMOS transistor 504 then outputs the amplified signal from the drain.

The PMOS transistor 510 has the gate electrically connected to the current source 511 and the drain of the NMOS transistor 504. The PMOS transistor 510 has a source electrically connected to the power supply SVDD, and a drain electrically connected to the source of the NMOS transistor 504 and the vertical signal line L1. The PMOS transistor 510 receives a signal output from the drain of the NMOS transistor 504. When the amount of drop of the electric potential of the vertical signal line L1 from the clipping electric potential VclipH is large, the PMOS transistor 510 feeds back, to the source of the NMOS transistor 504, a larger signal than that when the amount of drop is small.

When the amount of drop of the electric potential of the vertical signal line L1 from the clipping electric potential VclipH is large, the NMOS transistor 504 receives at the source a larger signal fed back from the PMOS transistor 510 than that when the amount of drop is small.

With this configuration, the following clipping operation can be performed.

When the electric potential of the vertical signal line L1 drops to turn on the NMOS transistor 504, the electric potential of a node N3 drops to turn on the PMOS transistor 510. That is, the gate of the PMOS transistor 510 receives an electric potential amplified by a positive gain factor with respect to a change of the electric potential of the vertical signal line L1. Thus, the drain current of the PMOS transistor 510 abruptly increases as the electric potential of the vertical signal line L1 drops. When the amount of drop of the electric potential of the vertical signal line L1 from the clipping electric potential VclipH is large, the PMOS transistor 510 feeds back, to the source of the NMOS transistor 504, a higher voltage than that when the amount of drop is small. When the sum of currents flowing through the current source 511 and the PMOS transistor 510 equals the value of a current flowing through the current source 112 of the vertical signal line L1, the electric potential of the vertical signal line L1 stabilizes.

In an embodiment, an efficient clipping operation sets the current value of a current flowing through the current source 511 of the NMOS transistor 504 to be smaller than a current flowing through the current source 112, and increases the gain of the common-gate amplification circuit 505.

In addition, for a similar reason, the transconductance of the common-source amplification circuit including the PMOS transistor 510 may be set larger than the current source 511 and the NMOS transistor 504.

For example, assume that the current value of a current flowing through the common-gate amplification circuit 505 is 1/M of the current value of a current supplied from the current source 112 to the vertical signal line L1. In this case, M is 1<M.

The electric potential of the vertical signal line L1 drops, and the electric potential of the source of the NMOS transistor 504 accordingly drops to turn on the NMOS transistor 504. The NMOS transistor 504 thereby supplies a current to the drain. At this time, in order to supply a current having a current value of 1/M of the current source 112 of the vertical signal line L1, the electric potential of the drain (node N3) of the NMOS transistor 504 abruptly drops as Vgs rises. Upon the abrupt drop of the electric potential of the node N3, the PMOS transistor 510 serving as a common-source amplification circuit is turned on to increase the drain current of the PMOS transistor 510.

The current value of a current supplied from the current source 112 to the vertical signal line L1 is indicated by "I1". When the current value of a current supplied from the NMOS transistor 504 becomes I1×1/M and a current supplied from the PMOS transistor 510 becomes I1×(M−1)/M, the clipping unit (clipping circuit) 520 stabilizes.

Assume that the transconductance of the PMOS transistor 510 is sufficiently larger than the current source 511 and the NMOS transistor 504. In addition, assume that the current source 511 and the NMOS transistor 504 operate in a saturation region when clipping the electric potential of the vertical signal line L1.

As described above, the clipping electric potential of the vertical signal line L1 is represented by: VRESH−Vth0−Vth1−Δov1−ΔVN1−Vth4 (threshold voltage of the NMOS transistor 504)−Δov4 (over-drive voltage of the NMOS transistor 504). Thus, the clipping electric potential of the vertical signal line L1 becomes lower than the reset level by (+ΔVN1+Vth4+Δov4).

As described above, in the present exemplary embodiment, the current value of a current supplied from the NMOS transistor 504 is 1/M of the current value of a current supplied from the current source 112 of the vertical signal line L1. The over-drive voltage Δov4 can be thereby made smaller than that in a case in which the NMOS transistor 504 supplies a current of the same current value as the current supplied from the current source 112. Thus, when the noise level of the vertical signal line L1 drops, the clipping electric potential of the vertical signal line L1 can be set higher than that in a case in which the NMOS transistor 504 supplies a current of the same current value as the current supplied from the current source 112. As a result, the imaging apparatus of the present exemplary embodiment can ensure the dynamic range of the vertical signal line L1.

In addition, in the imaging apparatus of the present exemplary embodiment, similar to the imaging apparatus of the fourth exemplary embodiment, a plurality of PMOS transistors 130 is arrayed respectively corresponding to a plurality of columns of vertical signal lines L1. Thus, the technical effect obtained in the imaging apparatus of the fourth exemplary embodiment can also be obtained in the imaging apparatus of the present exemplary embodiment.

In each of the above-described exemplary embodiments, electrons are used as signal charges, and an NMOS transistor is used as an amplification transistor. As another example, an imaging apparatus may use holes as signal charges, and a PMOS transistor as an amplification transistor. In this case, the generation of the high-brightness darkening phenomenon raises a noise-level voltage, so the clipping operation is performed to prevent the voltage from rising to a predetermined value or higher. In this case, a PMOS transistor can be used as a clipping transistor. The level shift amount is also to be appropriately adjusted in accordance with this PMOS transistor.

Sixth Exemplary Embodiment

Figure 12:
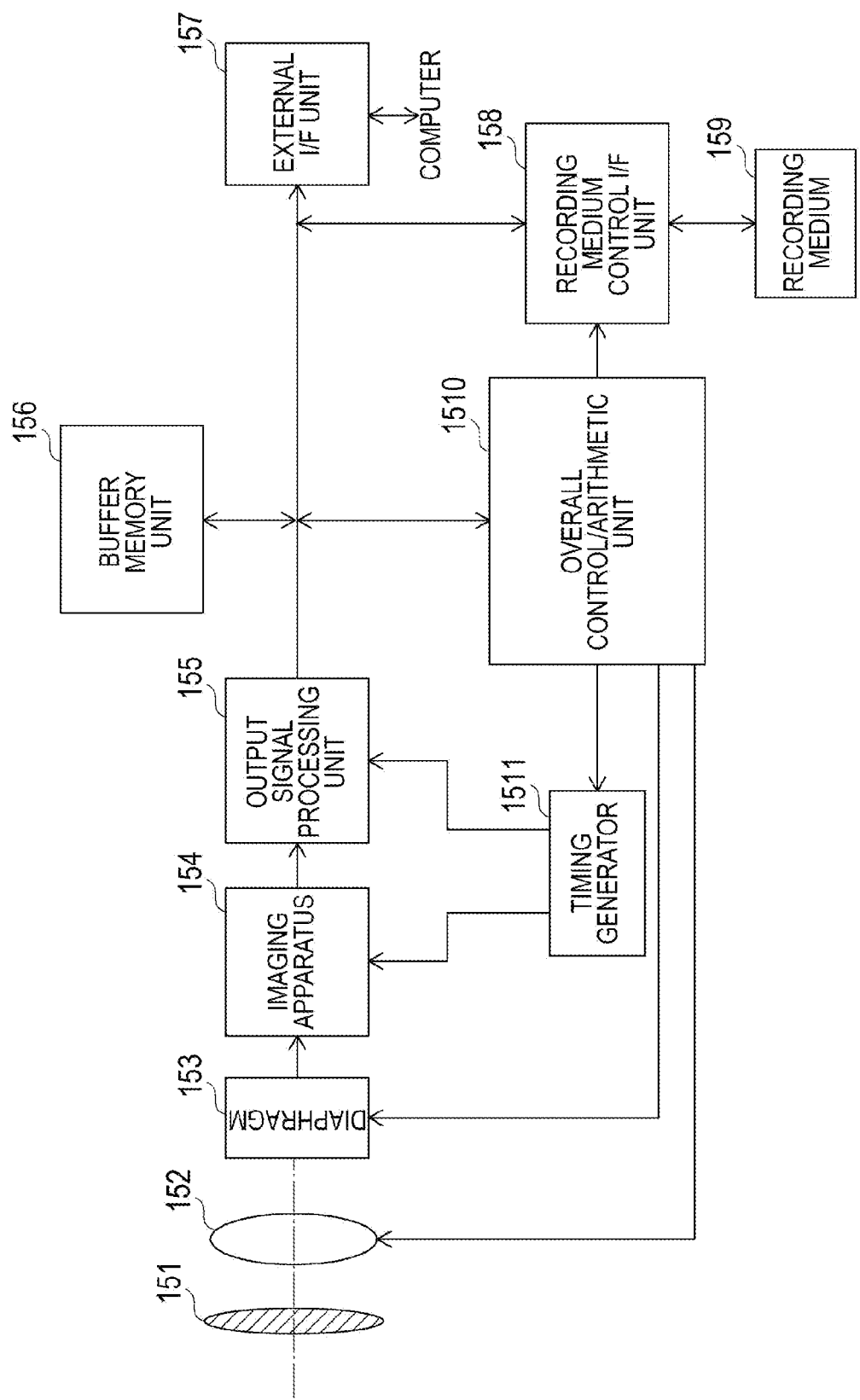
FIG. 12 is a diagram illustrating an example of a configuration of an imaging system.

The imaging apparatuses described in the above first to fifth exemplary embodiments can be applied to various imaging systems. Examples of the imaging systems include a digital still camera, a digital camcorder, and a monitoring camera. FIG. 12 is a schematic diagram illustrating, as an example, an imaging system in which any of the imaging apparatuses described in the above exemplary embodiments is applied to a digital still camera.

The imaging system exemplified in FIG. 12 includes an imaging apparatus 154, a barrier 151, a lens 152, and a diaphragm 153. The barrier 151 is provided for protecting the lens 152. The lens 152 forms an optical image of an object on the imaging apparatus 154. The diaphragm 153 is provided for adjusting the amount of light passing through the lens 152. The lens 152 and the diaphragm 153 serve as an optical system for condensing light onto the imaging apparatus 154. The imaging system exemplified in FIG. 12 further includes an output signal processing unit 155 for processing an output signal output from the imaging apparatus 154.

The output signal processing unit 155 performs AD conversion for converting an analog signal output from the imaging apparatus 154 into a digital signal. In addition, the output signal processing unit 155 further performs various types of correction and compression as necessary to perform an operation for outputting image data. The imaging system exemplified in FIG. 12 further includes a buffer memory unit 156 for temporarily storing image data, and an external interface unit (external I/F unit) 157 for communicating with an external computer or the like. The imaging system further includes a recording medium 159 such as a semiconductor memory, and a recording medium control interface unit (recording medium control I/F unit) 158. The recording medium 159 is provided for recording or reading captured image data. The recording medium control interface unit 158 is provided for performing recording onto or reading from the recording medium 159. The recording medium 159 may be built into the imaging system, or may be detachably attached thereto.

The imaging system further includes an overall control/arithmetic unit 1510 and a timing generator 1511. The overall control/arithmetic unit 1510 performs various types of arithmetic, and controls the entire digital still camera. The timing generator 1511 outputs various timing signals to the imaging apparatus 154 and the output signal processing unit 155. The timing signals or the like may be input from outside. The imaging system may include at least the imaging apparatus 154 and the output signal processing unit 155 for processing an output signal output from the imaging apparatus 154. As described above, the imaging system of the present exemplary embodiment can perform an image-capturing operation by applying the imaging apparatus 154 thereto.

The present invention is not limited to the above-described exemplary embodiments, and the exemplary embodiments can be appropriately modified and combined without departing from the scope of the invention.

The present invention can reduce a charge/discharge current that flows between a power supply line electrically connected to a holding capacitance and the holding capacitance. Accordingly, the present invention can suppress the decrease in the accuracy of a signal output from a pixel that results from an operation related to the holding capacitance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-137248, filed Jul. 2, 2014, which is hereby incorporated by reference herein in its entirety.

What is claimed is:

1. An imaging apparatus, comprising:
a plurality of pixels arrayed in a matrix, the plurality of pixels each including a photoelectric conversion unit, a charge-voltage converter configured to convert charges into a voltage, a transfer unit configured to transfer the charges from the photoelectric conversion unit to the charge-voltage converter, and an output unit configured to output a signal that is based on an electric potential of the charge-voltage converter;
a signal line;
a holding unit;
a clipping unit;
a holding capacitance; and
a supply unit connected to a power supply line, wherein
the clipping unit includes a clipping transistor for clipping an electric potential of the signal line, one of a source and a drain of the clipping transistor is connected to the signal line, and a reference electric potential is supplied to the other one of the source and the drain of the clipping transistor,
the holding capacitance includes a first node connected to a control node of the clipping transistor, and a second node to which a plurality of electric potentials being different in electric potential from one another is supplied from the supply unit,
the output unit outputs, to the signal line, a first signal that is based on a reset electric potential of the charge-voltage converter,
the holding unit holds the first signal that is output to the signal line,
the output unit subsequently outputs, to the signal line, a second signal that is based on the electric potential of the charge-voltage converter to which the charges are transferred from the photoelectric conversion unit,
the holding unit holds the second signal that is output to the signal line,
an electric potential of the first node is a first electric potential during a period in which the charge-voltage converter is reset,
the electric potential of the first node shifts from the first electric potential to a second electric potential during a period from when the holding unit holds the first signal to when the holding unit holds the second signal, and
by maintaining causing a path between the second node and the supply unit to be in a non-conductive state during a period from when the electric potential of the first node starts to shift from the first electric potential to the second electric potential to when the holding unit holds the second signal, the second node is maintained being in an electrically-floating state during a period from when the electric potential of the first node starts to shift from the first electric potential to the second electric potential to when the holding unit holds the second signal.

2. The imaging apparatus according to claim 1, wherein the output unit is a transistor of a same conductivity type as that of the clipping transistor,
one of a source and a drain of the transistor is connected to the signal line,
the other one of the source and the drain of the transistor is connected to the power supply line,
the charge-voltage converter is connected to a gate of the transistor, and
the first signal and the second signal are signals output by the transistor to the signal line based on an electric potential of the gate.

3. The imaging apparatus according to claim 2, wherein the source and the drain of the transistor and the source and the drain of the clipping transistor are provided in a common well region.

4. The imaging apparatus according to claim 3, wherein the supply unit is provided in a well region separated from the well region in which the source and the drain of the transistor and the source and the drain of the clipping transistor are provided.

5. The imaging apparatus according to claim 1, wherein the power supply line and the second node are connected to the supply unit via a buffer,
another power supply line is connected to the second node via a switch, and
the switch and the buffer are in a parallel relation with respect to the second node.

6. The imaging apparatus according to claim 5, wherein the imaging apparatus includes a plurality of signal lines, a plurality of clipping units, a plurality of holding capacitances, and a plurality of switches, and
the plurality of signal lines, the plurality of clipping units, the plurality of holding capacitances, and the plurality of switches are arranged so as to respectively correspond to columns of a plurality of output units that are arrayed in a matrix.

7. An imaging system, comprising:
the imaging apparatus according to claim 1; and
a processing unit configured to output image data that is based on a signal output from the imaging apparatus.

8. A driving method of an imaging apparatus including:
a plurality of pixels arrayed in a matrix, the plurality of pixels each including a photoelectric conversion unit, a charge-voltage converter for converting charges into a voltage, and an output unit for outputting a signal that is based on an electric potential of the charge-voltage converter;
a signal line;
a holding unit;
a clipping unit;
a holding capacitance; and
a supply unit connected to a power supply line,
the clipping unit including a clipping transistor for clipping an electric potential of the signal line, one of a source and a drain of the clipping transistor being connected to the signal line, and a reference electric potential being supplied to the other one of the source and the drain of the clipping transistor,
the holding capacitance including a first node connected to a control node of the clipping transistor, and a second node to which a plurality of electric potentials being different in electric potential from one another is supplied from the supply unit, the driving method comprising:
outputting to the signal line a first signal that is based on a reset electric potential of the charge-voltage converter;
holding the first signal output to the signal line;
subsequently outputting to the signal line a second signal that is based on an electric potential of the charge-voltage converter to which the charges are transferred from the photoelectric conversion unit;

holding the second signal output to the signal line;

setting an electric potential of the first node to a first electric potential during a period in which the charge-voltage converter is reset;

shifting the electric potential of the first node from the first electric potential to a second electric potential during a period from when the holding unit holds the first signal to when the holding unit holds the second signal; and by maintaining causing a path between the second node and the supply unit to be in a non-conductive state during a period from when the electric potential of the first node starts to shift from the first electric potential to the second electric potential to when the holding unit holds the second signal, maintaining causing the second node to be in an electrically-floating state during a period from when the electric potential of the first node starts to shift from the first electric potential to the second electric potential to when the holding unit holds the second signal.

9. The driving method according to claim 8, wherein the output unit is a transistor of a same conductivity type as that of the clipping transistor, one of a source and a drain of the transistor is connected to the signal line, the other one of the source and the drain of the transistor is connected to the power supply line, the charge-voltage converter is connected to a gate of the transistor, and the first signal and the second signal are signals output by the transistor to the signal line based on an electric potential of the gate.

10. The driving method according to claim 9, wherein the source and the drain of the transistor and the source and the drain of the clipping transistor are provided in a common well region.

11. The driving method according to claim 10, wherein the supply unit is provided in a well region separated from the well region in which the source and the drain of the transistor and the source and the drain of the clipping transistor are provided.

12. The driving method according to claim 8, wherein the power supply line and the second node are connected to the supply unit via a buffer, another power supply line is connected to the second node via a switch, and the switch and the buffer are in a parallel relation with respect to the second node.

13. The driving method according to claim 12, wherein the imaging apparatus includes a plurality of signal lines, a plurality of clipping units, a plurality of holding capacitances, and a plurality of switches, and the plurality of signal lines, the plurality of clipping units, the plurality of holding capacitances, and the plurality of switches are arranged so as to respectively correspond to columns of a plurality of output units that are arrayed in a matrix.

* * * * *